May 8, 1962  C. THUMIM  3,033,067
WORK HOLDING AND CONVEYING MEANS FOR AUTOMATIC CUTTER
Filed Nov. 7, 1956  11 Sheets-Sheet 1
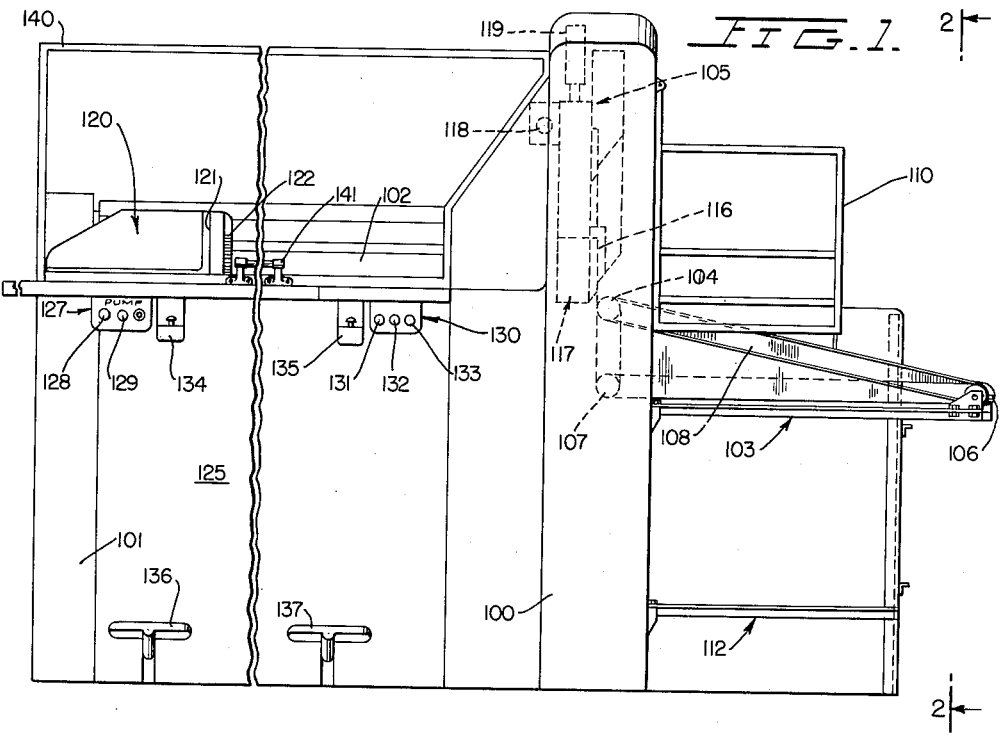
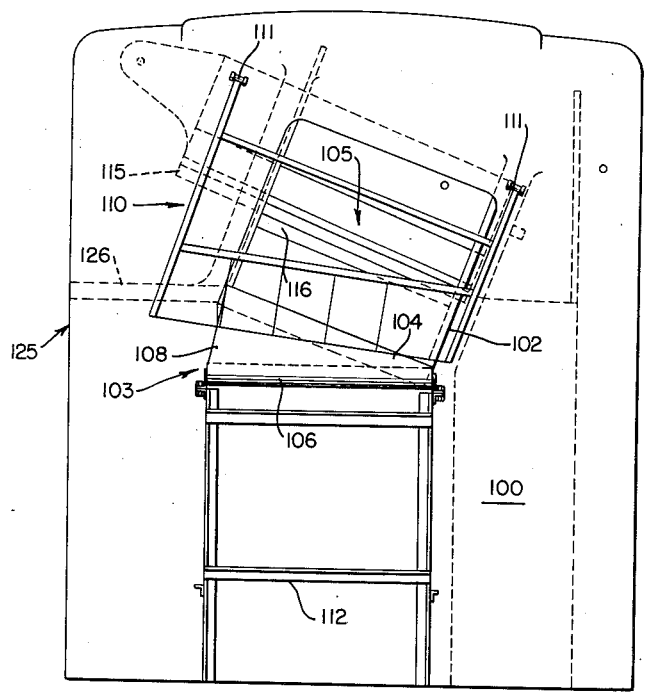
INVENTOR.
CARL THUMIM
BY
ATTORNEYS

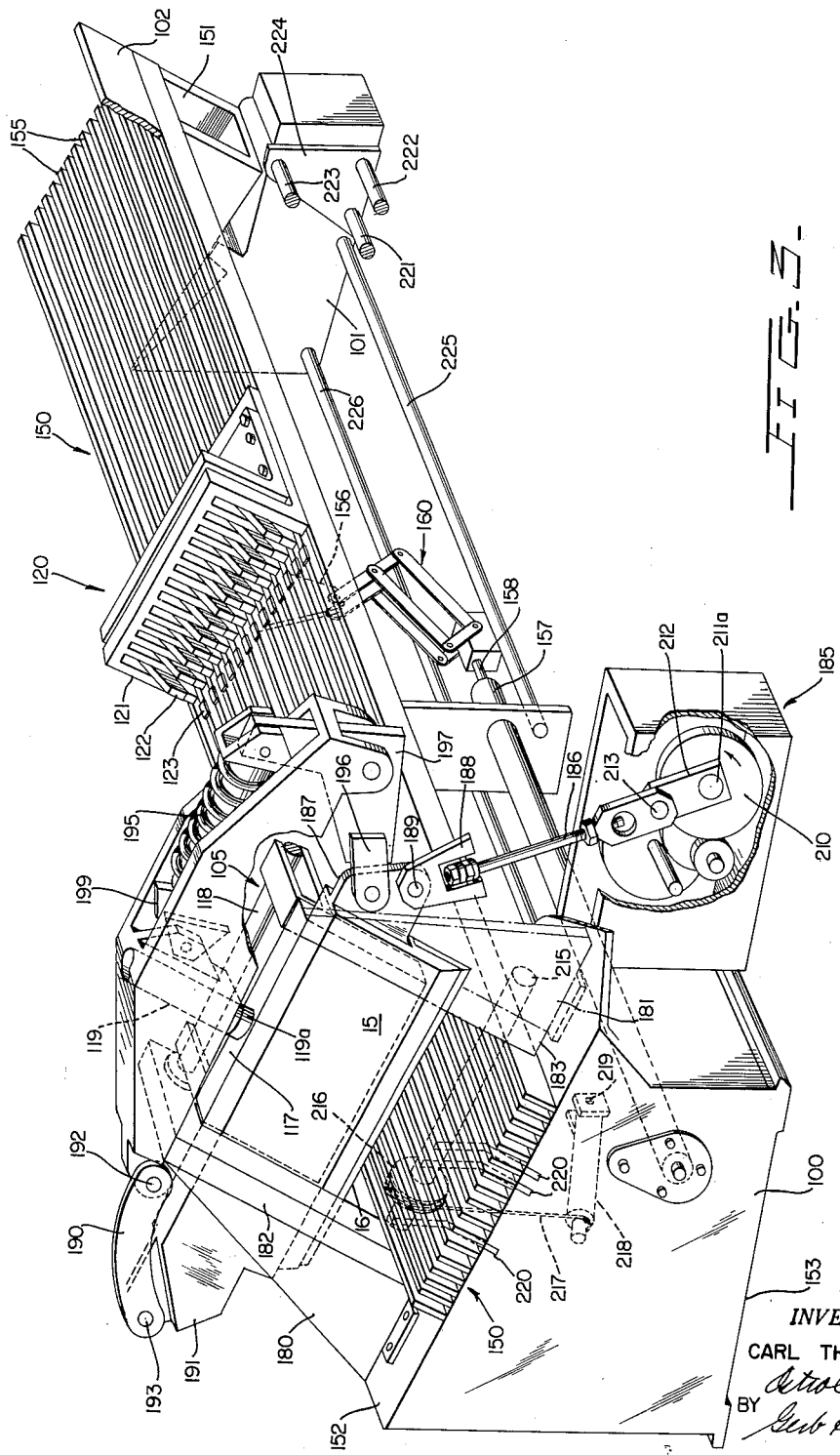

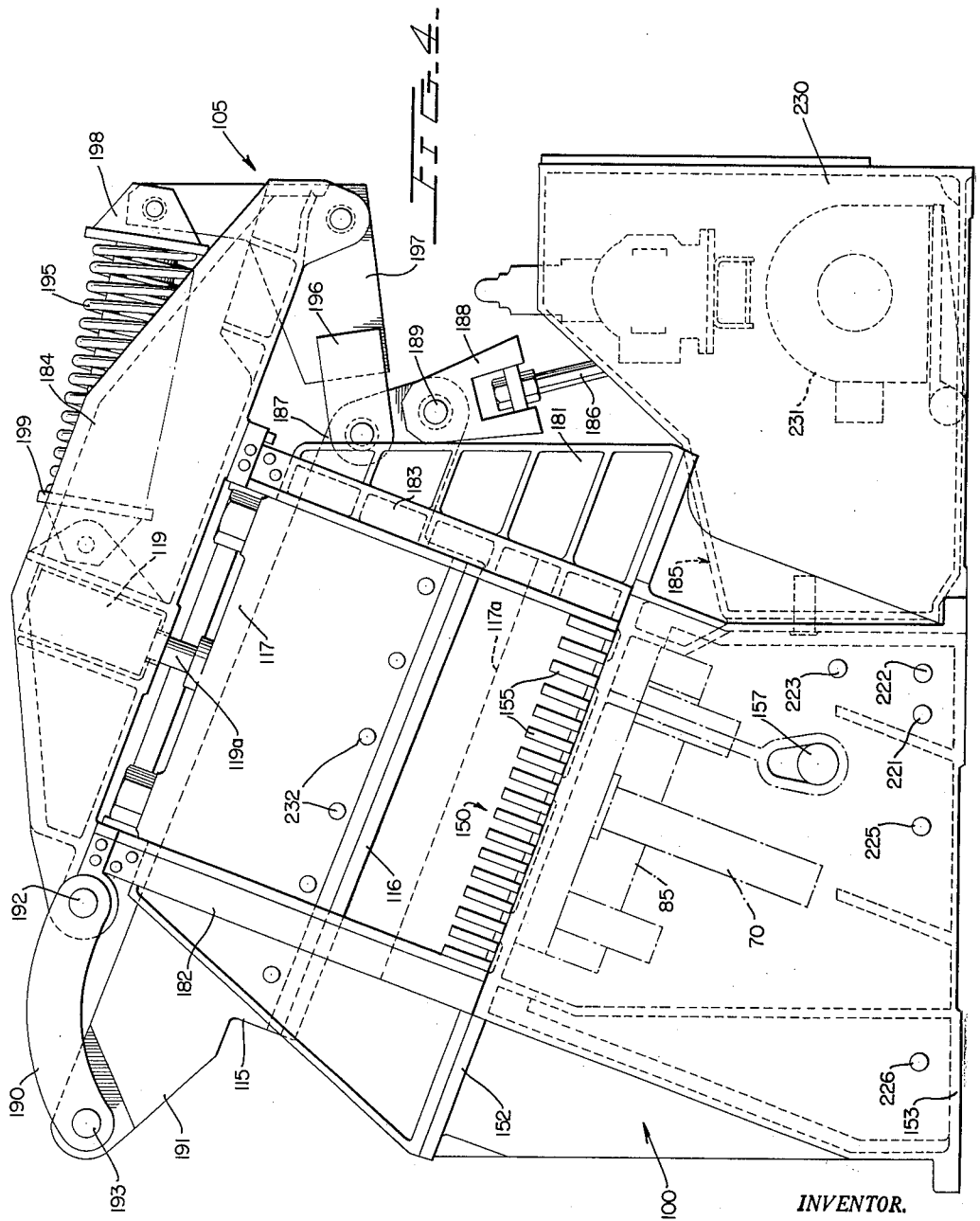

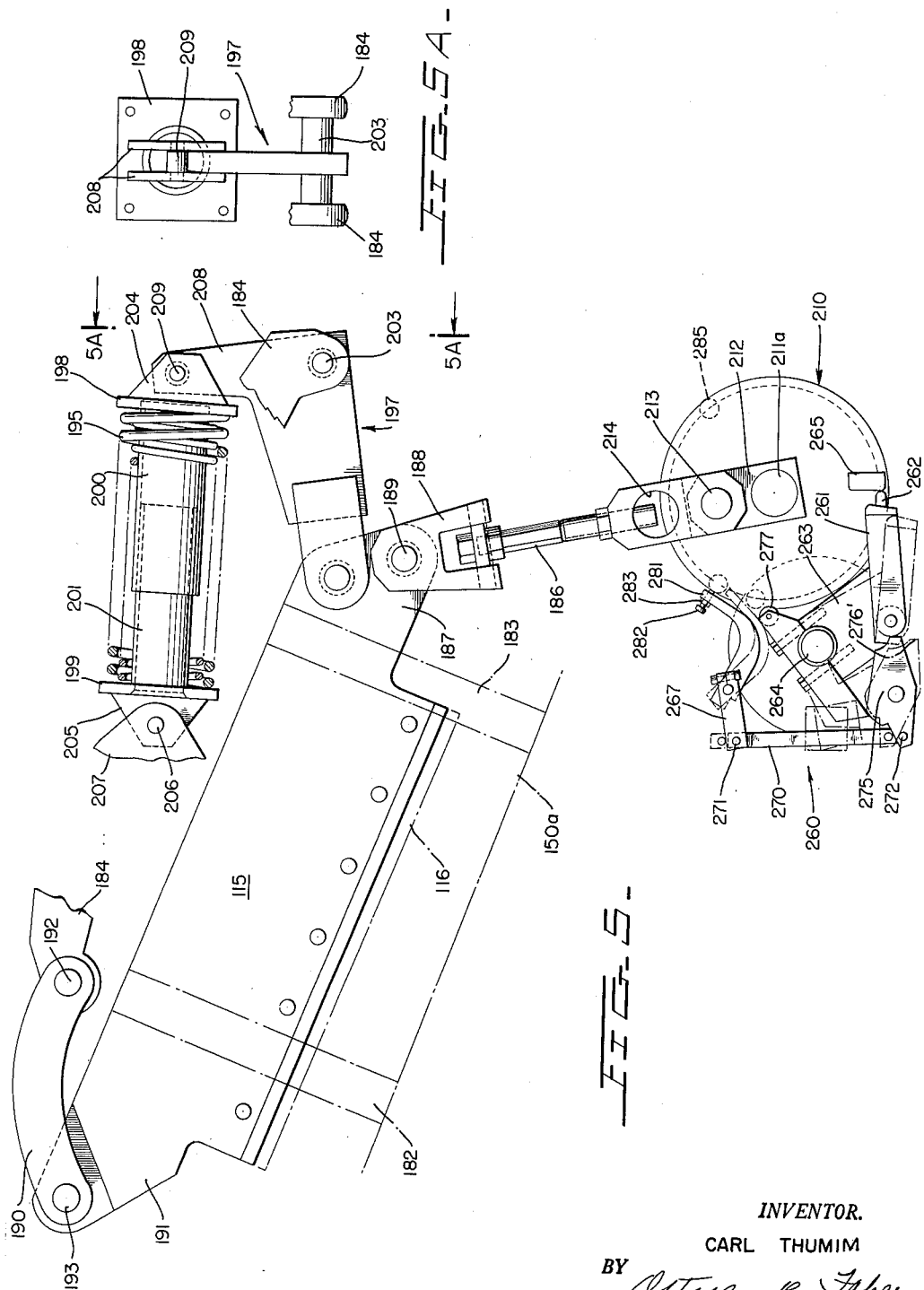

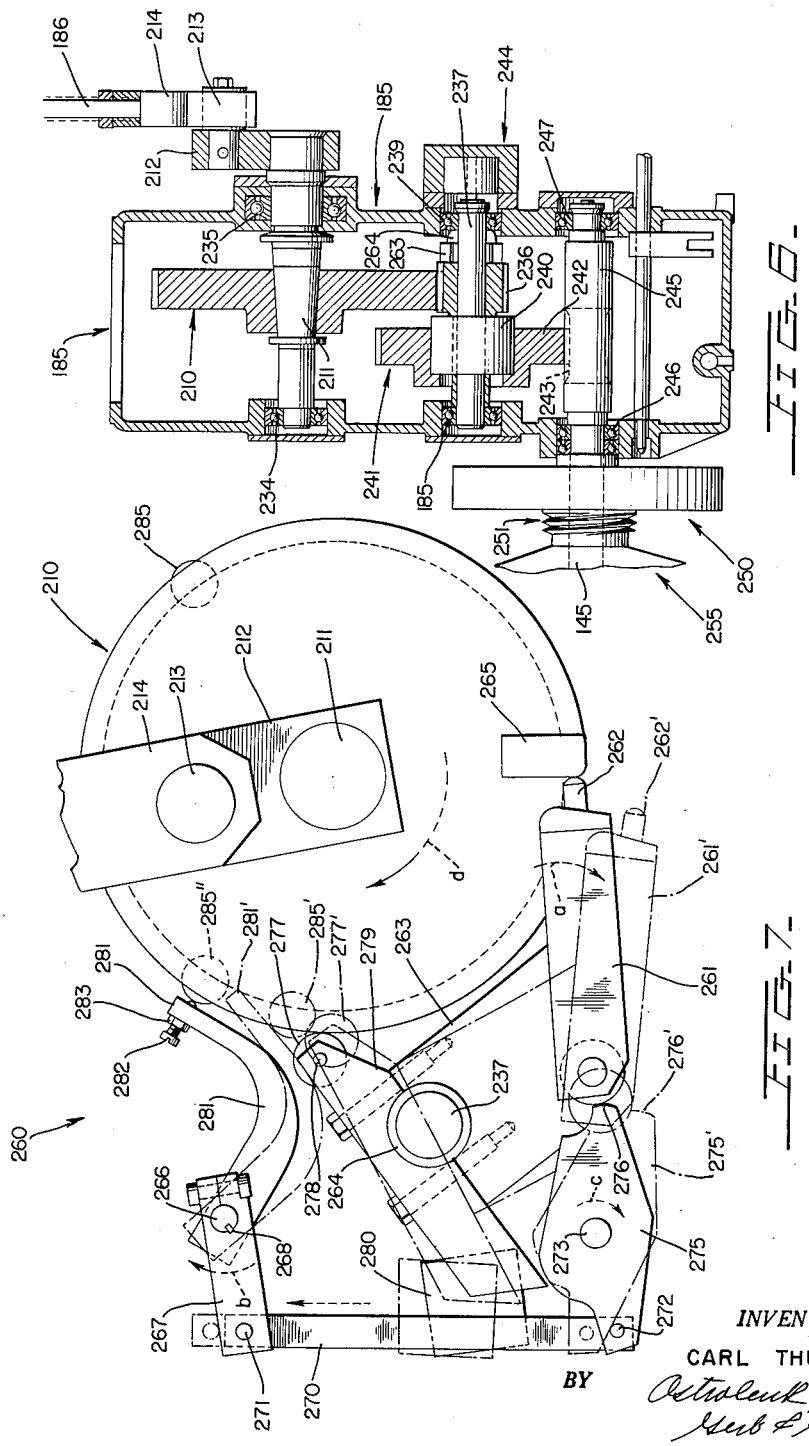

May 8, 1962 C. THUMIM 3,033,067
WORK HOLDING AND CONVEYING MEANS FOR AUTOMATIC CUTTER
Filed Nov. 7, 1956 11 Sheets-Sheet 6
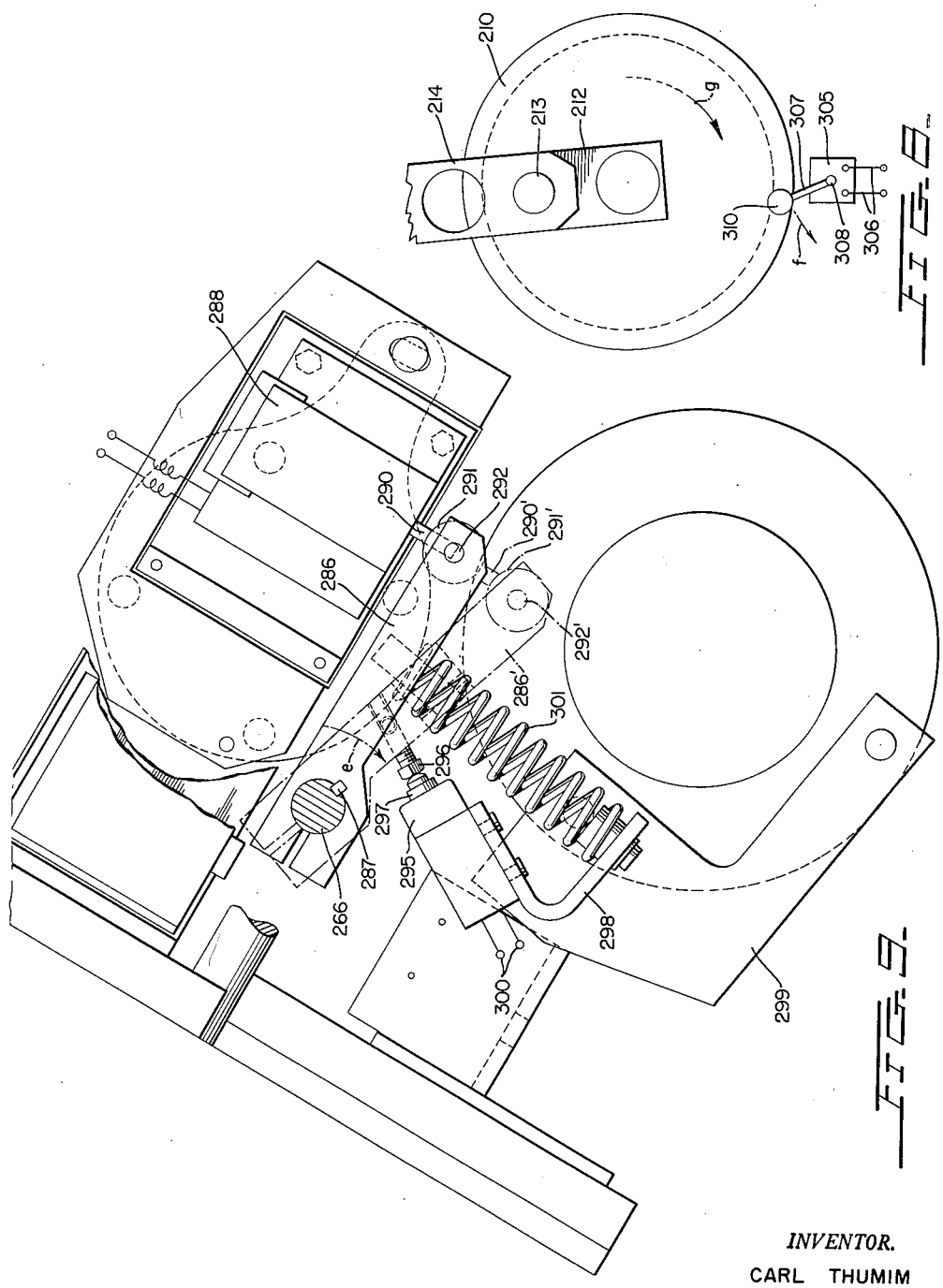
INVENTOR.
CARL THUMIM
BY
ATTORNEYS May 8, 1962 C. THUMIM 3,033,067
WORK HOLDING AND CONVEYING MEANS FOR AUTOMATIC CUTTER
Filed Nov. 7, 1956 11 Sheets-Sheet 7
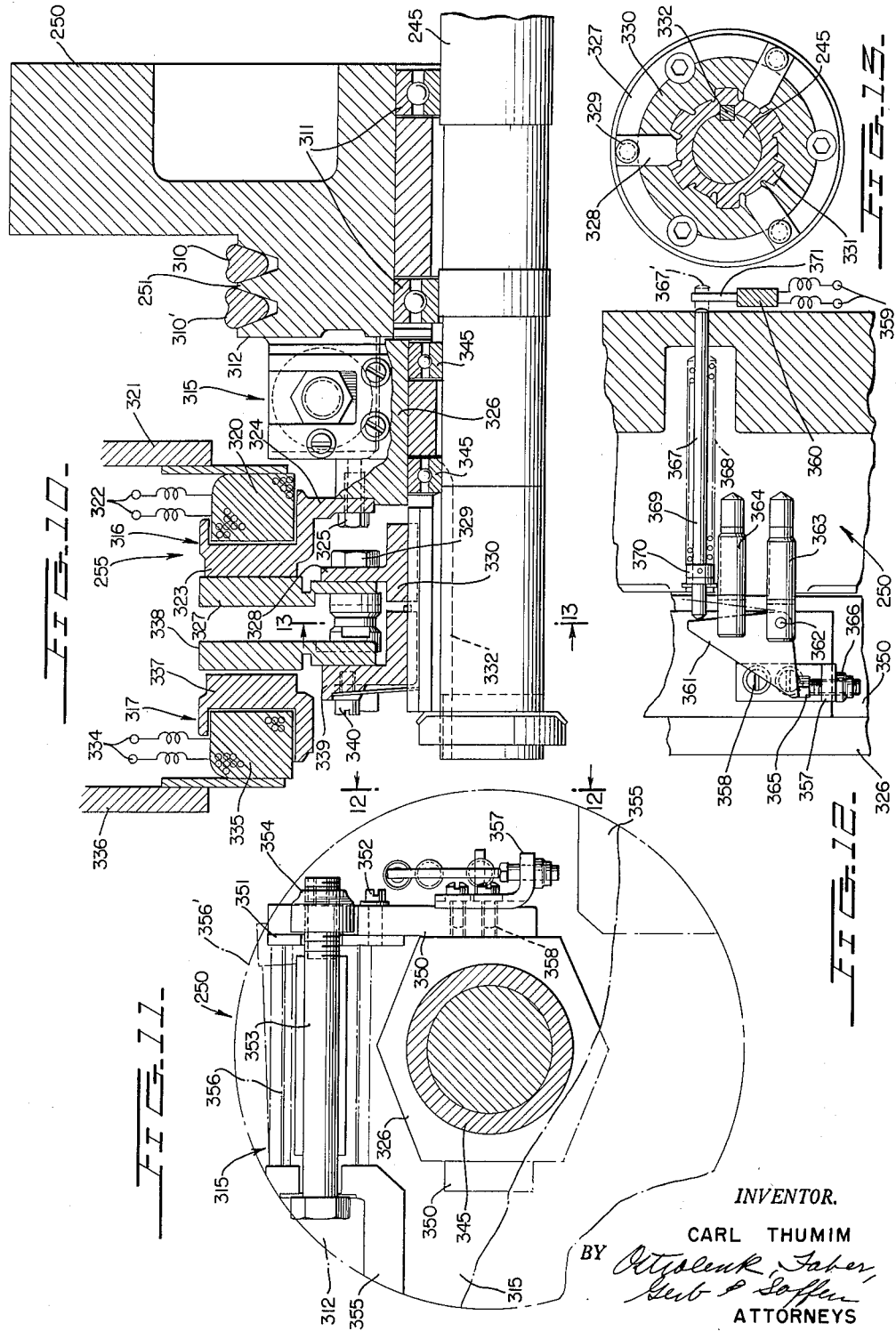
INVENTOR.
CARL THUMIM
BY
ATTORNEYS

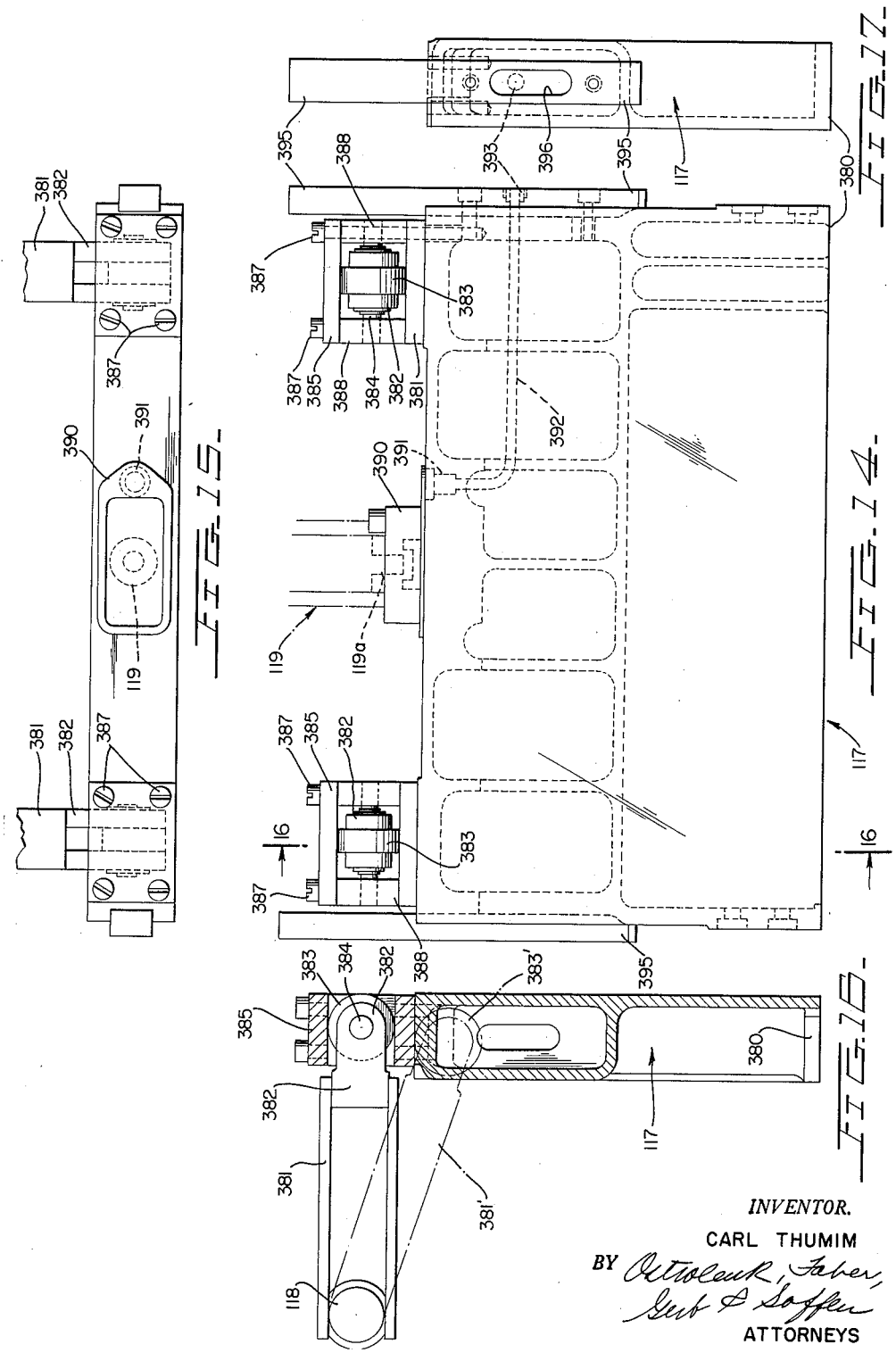

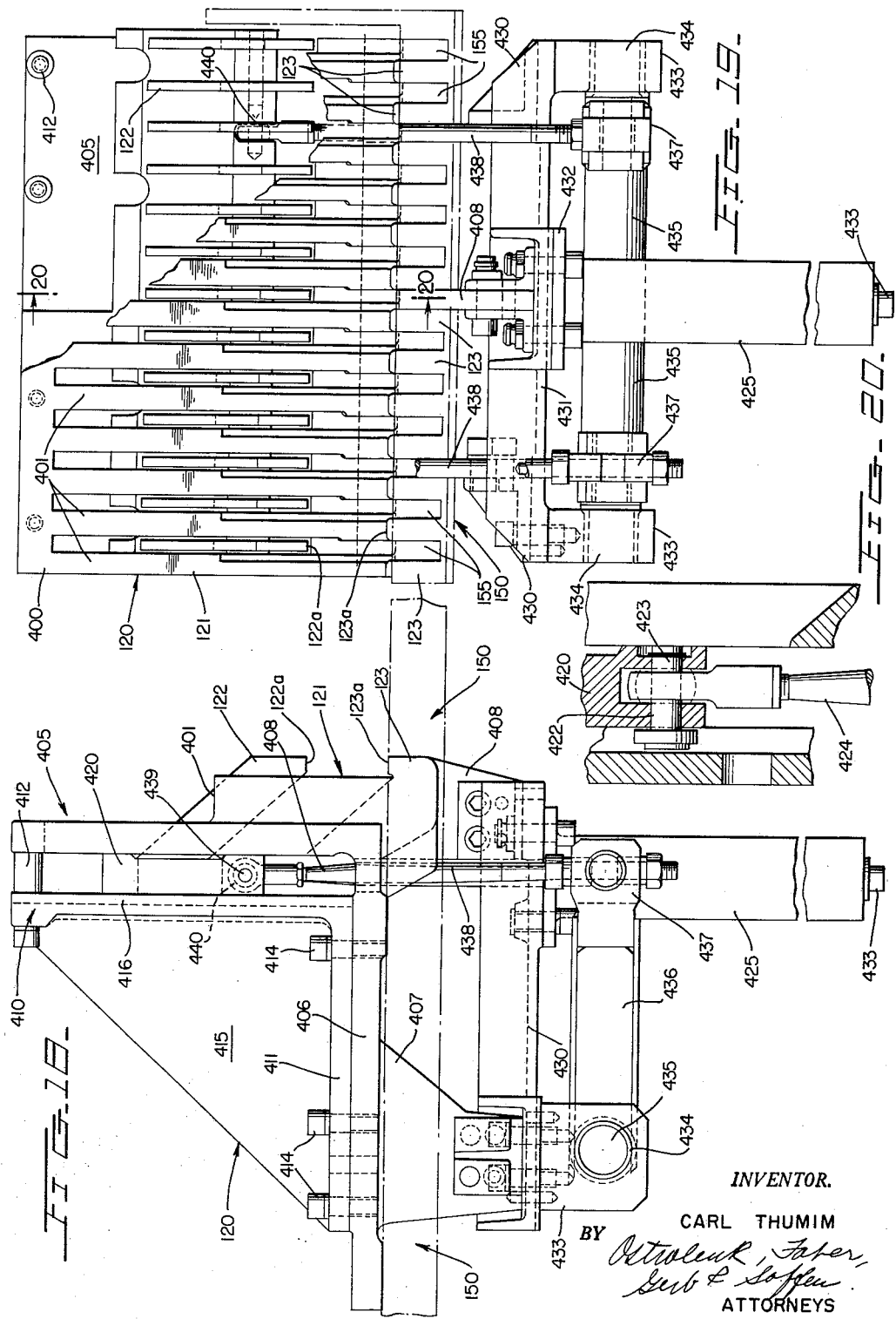

May 8, 1962　　　　　　C. THUMIM　　　　　3,033,067
WORK HOLDING AND CONVEYING MEANS FOR AUTOMATIC CUTTER
Filed Nov. 7, 1956　　　　　　　　　　　　　　11 Sheets-Sheet 10
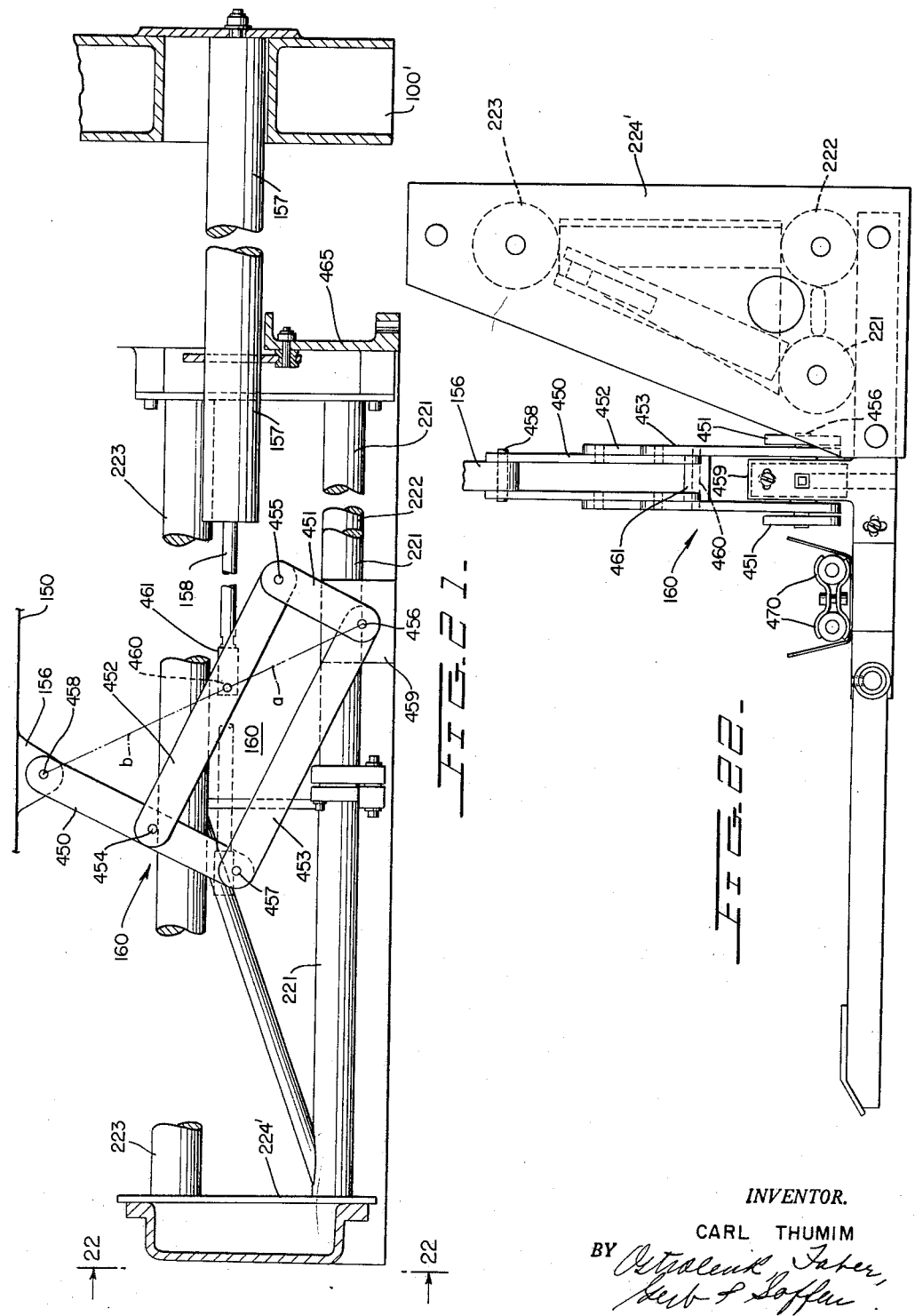
INVENTOR.
CARL THUMIM
ATTORNEYS May 8, 1962 C. THUMIM 3,033,067
WORK HOLDING AND CONVEYING MEANS FOR AUTOMATIC CUTTER
Filed Nov. 7, 1956 11 Sheets-Sheet 11
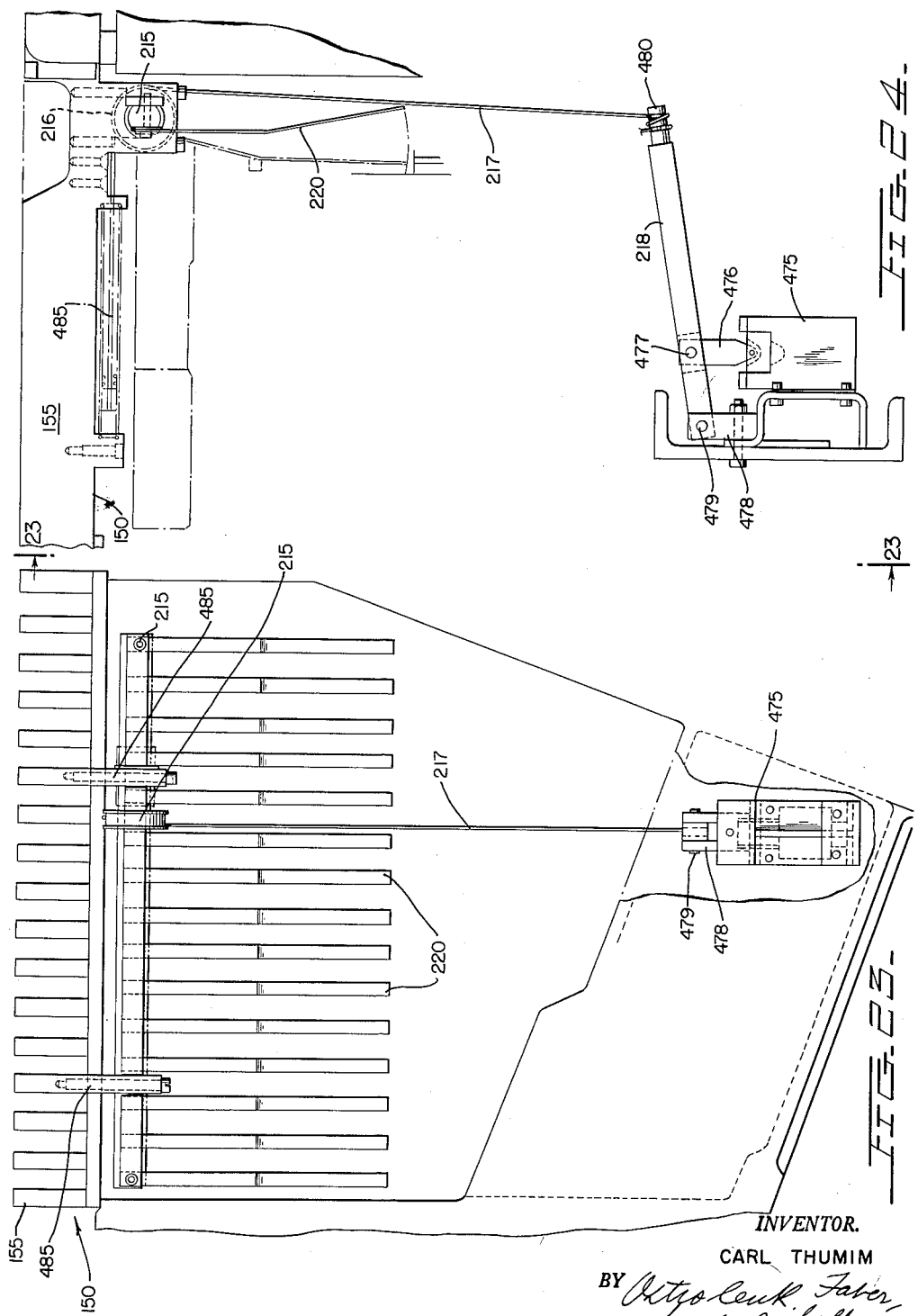
INVENTOR.
CARL THUMIM
BY
ATTORNEYS

3,033,067
WORK HOLDING AND CONVEYING MEANS FOR AUTOMATIC CUTTER

Carl Thumim, Westbury, N.Y., assignor, by mesne assignments, to Miehle-Goss-Dexter, Inc., Chicago, Ill., a corporation of Delaware
Filed Nov. 7, 1956, Ser. No. 620,928
4 Claims. (Cl. 83—206)

The present invention relates to cutting machines and more particularly relates to a novel machine for automatically effecting spaced transverse cuts predeterminedly along a stack of sheets.

In a cutting machine of the type herein, a stack of paper sheets is supported on a horizontal table. A reciprocable knife blade is provided at the front end of the machine to execute transverse cuts on the paper stack in a predetermined manner. Reference is made to Patent No. 2,570,873 as typical of such type of machine. A clamp for holding the paper stack intact is arranged adjacent the knife blade, to act upon the stack as it is being transversely cut. A back gauge is provided at the rear end of the stack, movable towards the front, along the table on which the stack is supported. The back gauge is moved in a predetermined manner to push the stack forward between cutting operations of the knife. A start-stop program device is generally related with the back gauge to automatically start its movement and stop it at predetermined positions during the cutting cycles of the knife assembly. Such back gauge system in a cutting machine is illustrated and described in Patent No. 2,487,031 entitled "Automatic Back Gauge Spacer" and assigned to the same assignee as this case.

It has been found in the operation of cutting machines that the stack of sheets shifts or otherwise distorts its vertical alignment necessary to provide accurate transverse cutting of each sheet along predetermined positions. It is to be understood that when a cutting machine is used to sever pages of a book printed multiply on a long sheet (or advertising matters; or soap wrappers, etc.) it is necessary to sever the individually printed units at their exact predetermined borders. Also, where printing frames effect small unprinted areas between the printed wrappers or pages, "trim-out" cutting is needed to end up with cleanly cut, accurately sized pages or wrappers, etc. Since identical multiple printed long sheets are arranged in a pile or stack, the imprints of the wrappers, pages, etc. must all be perfectly aligned and stacked in the up and down or vertical relation in order that the transverse cuts by the reciprocable knife be effected on each border of each printed unit, as is understood by those skilled in the art.

Pushing of the stack of sheets along the work table by the back gauge often causes the stack to "walk," i.e., to distort its vertical alignment of identically printed material. In other words, the forward edge of the stack shifts out of a vertical plane into an angular plane. It is readily apparent that such "walking" or shifting of the stack of sheets will result in the cutting of intermediate sheets at erroneous positions. Thus, non-registration of cutting will result on sheets in the stack. Consequently, it has been the practice of operators of a cutting machine to readjust the alignment of the stack at practically every cutting. Also, the front clamp at the knife blade that holds the front edge of the stack firmly during cutting also often distorts the stack alignment.

Repositioning of the stack by the operator manually, of course, slows down the overall output or production by the machine. It is also hazardous for an operator to adjust the stack at the knife or front end of the machine despite any safety precautions. In an effort to maintain production output, operators often by-pass the safety devices and carelessly believe that they can "beat" the machine. Severed fingers have resulted in unfortunate instances.

It is an important object of the present invention to provide full automaticity to a cutting machine for stacks or piles of sheets whereby it is unnecessary for an operator to adjust the stack during the whole cutting program thereon. "Walking" and other distortion of the piled sheets constituting the stack are eliminated by features of the invention herein to be set forth in detail hereinafter. Cutting of stacks of sheets of the present invention is performed exactly as programmed on a start-stop basis with no need for interruption of the program. The result is maximum production output without any hazardous interludes.

It is also an important feature of the present invention to provide novel means for positive motivation of a stack of sheets in a cutting machine wherein the transverse cutting cycles thereon may be speeded up, as compared to cutting machines heretofore available. By preventing the stack from distorting, in a definite and positive mechanical manner, the speeds of movement of the stack along the cutting machine table between cuts may be at a much greater rate than heretofore possible. Of course, the stack is moved relatively slowly between the short spacings of a "trim-out" cut. The overall production output is thereby further increased due to such higher speed and to the fact that the operator need not stop the machine for adjusting the paper stack alignment at the cutting end.

In accordance with the present invention, a clamp is provided at the back gauge that holds the stack in its vertical plane and maintains accurate registry of all the imprints on the successive piled sheets. The back gauge clamp extends transversely across the stack along the operating face of the back gauge. The intensity of force exerted by the back gauge clamp on the stack of sheets is made equal to and preferably greater than the intensity of force exerted by the clamp which is directly back of the knife blade. In other words, the clamp used at the cutting or front end must not be able to loosen the stack which is held by the back gauge clamp under any conditions of operation. The invention herein, as will be set forth in detail hereinafter, incorporates a powerful clamp at the operating face of the back gauge, which clamp travels with the back gauge forming, in effect, a travelling table for the stack of sheets.

The aforesaid back gauge clamp keeps the stack clamped regardless of the pressure exerted by the knife blade clamp. This means that after a transverse cut, the sheets of the stack remain in the same vertical alignment and registry that they were before the cut; and the cutter clamp does not disturb the stack to cause inaccuracy in cutting. Also, an important advantage results when the stack is clamped very tightly to the back gauge, as accelerations due to the starting of the automatic spacing device or decelerations due to the stopping of the spacing device do not affect the motion of the sheets as a stack; whereby the stack remains intact in its perpendicular relationship of the sheets constituting the stack and hugs the back gauge firmly under all circumstances to afford accuracy in cutting.

Due to the firm hold that the back gauge clamp provides on the pile of sheets, the speed of operation or movement of the pile by the back gauge towards the cutting blade may be increased beyond the rate of prior art machines; and stoppages of the pile for the cutting position may be made more sudden without losing control of the sheets of the stack. Such resultant reduction of time between cuts increases the production output of each machine. Also, as stated above, the fact that the operator does not need to stop the machine to straighten the pile practically after each cut results in a cutting machine that is fully automatic in its practical embodiment. In fact, it has been found that once a stack is clamped to the back gauge clamp, and the machine started in its programmed cycle, no further attention from the operator is required until the cutting cycle is completed on the stack, and the next stack of sheets is to be inserted in the machine.

A further important novel feature of the present invention is the provision of a work table in a cutting machine for stacks of sheets at an angle to the horizontal.

In a cutting machine in accordance with the present invention, the work table is tilted at a small angle to the horizontal longitudinal direction to safely overcome the tendency of the paper sheets to leave the side guide or gauge. The table tilt is the direction of the side guide or gauge of the machine (arranged longitudinally) wherein the longitudinal side paper stack abuts the side gauge. The side gauge is perpendicular to the tilted work table. In other words, the side gauge is tilted at a small angle to the vertical in this embodiment; and the work table is tilted by the same angle to the horizontal and in turn is perpendicular to the side gauge, all along the direction of travel of the stack longitudinally of the cutting machine. The back gauge is perpendicular to the tilted work table as is the cutting knife assembly. These latter units are thus all tilted at the same angle to horizontal in order that the cutting be normal to and transverse of the tilted paper stack.

Thus, an important element of the present invention is to provide a cutting mechanism, work table with a side gauge and back gauge, all tilted to maintain the stack against the side gauge, overcoming any possible tendency of the stack to distort its pile in a direction transverse to the movement of the stack. The paper sheets are thus held from sliding out of the vertical in the stack, in the sidewise direction.

The combination of such tilted work table and the aforesaid back gauge clamp at the rear of the stack further insures the elimination of any possible shifting of the sheets within the stack, either in the forward or transverse direction. The features of the tilted work table and of the back gauge clamp therein may be used independently in a cutting machine. However, their combination in a machine coacts to afford maximum efficiency, automaticity, and production speeds for the cutting machine as will be further understood and set forth hereinafter.

A still further feature of the present invention is a cutting machine work table for the stack of sheets formed by a plurality of spaced longitudinal bars. The spacing of the bars substantially reduces the friction to movement of the stack as along a solid work table. A further advantage of such novel work table is that cuttings and debris due to the operation of the machine on the stacks will fall below the level of the work table and not interfere with the cleanliness and smoothness of the work table to operations at hand. A further advantage is that the spaces between the bars provide room for the lower clamping members of the back gauge clamp assembly as will be described.

As a result of the fully automatic operation throughout the cutting cycle of the invention machine, it is possible to arrange the controls thereof at one side thereof. Also the loading of stacks of sheets for cutting by the machine is made from this side. Side loading of a cutting machine is more efficient than loading from the cutting end. Further, the operator can watch the progress of work and operation of different sections of the machine better from the side than merely from the front as heretofore. A transparent hood is preferably arranged over the work table and at the feed-out side of the machine (at the cutting end) to permit the operator to view the progress of the work in the machine and of the components of the machine in operation. Automatic switches to shut off the machine when either of the protective hoods is opened up thus may provide a safety feature whereby the machine cannot be operated with an opened hood.

Another feature of the invention cutting machine is an automatic ejector mechanism arranged at the knife end. Such ejector is automatically actuated after the last transverse cut is made upon the stack. The function of the ejector is to move the last portion of the cut stack out from the machine through the feed-out end. Also a novel mechanical drive is afforded for the back gauge so that its long traverse may be readily performed by a powerful hydraulically actuated piston in a horizontal plane. The novel use of a pantograph between the back gauge and the piston rod affords a perfectly linear drive for the back gauge along the machine parallel to the horizontally maintained piston drive. Another design utilizes a screw driven by two motors, clutches, etc., to effect accurate spacing.

Other important features of the present invention are embodied in the novel reciprocable cutting assembly. The knife operating mechanism, as will be set forth in detail hereinafter, incorporates a novel single cycle non-repeat device for operating the knife bar to cut only once upon an actuation and to prevent an uncontrolled descent of the knife bar until the next positive actuation therefor. Also, the novel knife mechanism is provided with a heavy spring that continually biases the knife in the upward position at all times, with a latch that keeps the knife from overtravelling beyond such upward position for safety purposes. With the knife thus maintained normally in the up or out-of-cutting position, the knife blade can be actuated downwardly only after the definite positive latch is released. Thus, should anything be wrong with the machine or knife mechanism, the knife blade will safely be out-of-cutting position. Other features for the novel knife cutting system herein will be set forth in detail hereinafter.

The advantages and features of the cutting machine of the present invention make the machine applicable not only for cutting up a single wide and long stack of sheets transversely in the manner set forth hereinabove but to also transversely cut simultaneously a plurality of adjacently placed long stacks of narrow sheets. A cutting machine used in such latter arrangement is often denoted as a "chopper." As a chopper, the machine incorporating the features herein such as the back gauge clamp and the tilted work table is advantageously arranged physically adjacent a cutting machine of the type as set forth hereinabove or in the patents aforesaid, or any other type that performs predetermined cuttings on a large, wide stack. For example, where a large stack has been cut into piles of sheets 3″ wide and 40″ long, such 3″ wide piles or sub-stacks are placed side by side in the lengthwise position along the work table of the chopper herein. Six of such 3″ wide piles can be placed together lengthwise along the work table herein with an 18″ wide bed. The six adjacent piles are simultaneously clamped by the back gauge clamp and the tilted work table maintains these long narrow piles or stacks contiguous with each other without any tendency for transverse slippage to distort them. The firm grip of the back gauge clamp prevents longitudinal distortion of the stack due either to the back gauge pushing, the action of the knife blade clamp, or the cutting operation itself. A speedy cutting cycle on the multiple stacks described herein is thus possible by the positive actuation of these multiple piles simultaneously through the machine herein used as a chopper.

It is accordingly among the objects of the present invention to provide a novel cutting machine for stacks of sheets incorporating a back gauge clamping device for the stacks.

Another object of the present invention is to provide a novel cutting machine incorporating a tilted work table for maintaining vertical stack alignment throughout the cutting cycles.

A further object of the present invention is to provide a novel cutting machine incorporating the combination of a work table tilted transverse to stack movement and a clamp for the stack at the back clamp, whereby positive feeding of a stack of sheets along the machine is maintained throughout the cutting cycles.

Still another object of the present invention is to provide a novel cutting machine that is fully automatic from start to finish of successive programmed cutting cycles on a stack of sheets.

A further object of the present invention is to provide a novel cutting machine with a segmented work table reducing the friction of movement on a stack of sheets thereon.

Another object of the present invention is to provide an automatic cutting machine for a stack of sheets, providing a positive feeding for the stack to the cutting blade throughout the program of cutting cycles, wherein maximum production output by the machine is attained.

Another object of the present invention is to provide a novel cutting machine incorporating positive feeding action for a stack of sheets wherein high speeds of movement and rapid stopping periods are afforded on the stack to cutting positions.

Still a further object of the present invention is to provide a novel reciprocable cutting mechanism.

A further object of the present invention is to provide a novel cutting blade mechanism with a single cycle non-repeating operation for safety purposes.

Another object of the present invention is to provide a novel cutting mechanism for a cutting machine incorporating a sizeable spring that normally biases the cutting blade in its upward or non-cutting position.

Still a further object of the present invention is to provide a novel drive for the back gauge of a cutting machine incorporating a linear pantograph linkage arrangement.

Another object of the present invention is to provide a cutting machine having a novel ejector mechanism automatically operative at the end of the cutting cycle.

The enumerated and other features of the present invention are illustrated in an exemplary embodiment of a cutting machine illustrated in the drawings. It is to be understood, however, that many of the novel features set forth in the exemplary machine may be incorporated in other types of machines. Referring now to the drawings, the exemplary embodiment is illustrated in the following figures:

FIGURE 1 is a side elevational view of the cutting machine as seen from the operator position with the central portion thereof broken away.

FIGURE 2 is an end elevational view of the cutting machine of FIGURE 1 at the "front" or "feed-out" position.

FIGURE 3 is a perspective view of the exemplary machine with portions thereof removed for the purposes of clarity of illustration.

FIGURE 4 is an enlarged illustration seen in end elevation of the cutting machine with the side frame and protective end hood removed, showing the cutting assembly, with associated portions thereof in dotted lines.

FIGURE 5 is a schematic mechanical arrangement of the cutting knife assembly including its drive elements and single cycle safety control.

FIGURE 5A is a side view of a portion of the linkage of the cutting mechanism as seen along line 5A—5A of FIGURE 5 in the direction of the arrows.

FIGURE 6 is a cross-sectional view through the power drive mechanism of the knife assembly.

FIGURE 7 is an enlarged view of the mechanism providing the single cycle non-repeat operation of the cutting blade, also as seen in the lower portion of FIGURE 5.

FIGURES 8 and 9 are further details of the single cycle non-repeat device of FIGURE 7.

FIGURE 10 is an enlarged cross-sectional view of the drive control mechanism for the knife assembly.

FIGURE 11 is an enlarged end view of the overload device of the knife drive mechanism of FIGURE 10 as seen along the line 11—11 of FIGURE 10 in the direction of the arrows.

FIGURE 12 is an end view of the overload switch in the knife overload device as seen from the line 12—12 of FIGURE 11 in the direction of the arrows.

FIGURE 13 is a sectional view through the knife drive mechanism of FIGURE 10 taken along the line 13—13 thereof.

FIGURE 14 is an elevational view of the clamp and torque bar assembly for the knife mechanism.

FIGURE 15 is a top view of the clamp assembly of FIGURE 14.

FIGURE 16 is a cross-sectional view through the assembly of FIGURE 14 taken along the line 16—16 as seen in the direction of the arrows in FIGURE 14.

FIGURE 17 is an end elevational view of the assembly of FIGURE 14 as seen from the right end thereof.

FIGURE 18 is an enlarged illustration of the back gauge and associated clamp as seen from the end elevational view thereof.

FIGURE 19 is a front elevational view of the back gauge and the associated clamp.

FIGURE 20 is a detail view of FIGURE 19 taken along the line 20—20 thereof in the direction of the arrows.

FIGURE 21 illustrates the pantograph hydraulic drive mechanism for the back gauge incorporated in the exemplary machine herein.

FIGURE 22 is an end view of the pantograph drive, enlarged, as seen from the line 22—22 of FIGURE 21 in the direction of the arrows.

FIGURE 23 is an enlarged illustration of the ejector mechanism.

FIGURE 24 is an end view of the ejector of FIGURE 23 as seen from the right end thereof.

CUTTING MACHINE: ASSEMBLED

FIGURES 1 and 2 show the side and "front" end elevations, respectively, of an exemplary cutting machine. Since, as will be hereinafter set forth in detail, the invention cutting machine is fully automatic, it is not necessary to tend to the machine, or to the stack being cut, during the program of cutting cycles. The "front" end, as is normally termed in such commercial machines, will be herein also termed the "feed-out" position, corresponding to the position on the right end of the machine seen in FIGURE 1, and as seen in elevation in FIGURE 2. The front portion of the stack of sheets, after being cut off, is fed out from the "feed-out" end.

The main column 100 of the machine supports the guide supports for the knife cutting assembly, as will be detailed hereinafter, as well as the frame section of the balance of the machine including the work table. The left side column 101 is an additional support for the machine and includes the circuit and relay panel for the electrical control system herein. Main column 100 serves also as an oil reservoir for the hydraulic servo components of the machine. The work table (not seen in FIGURES 1 and 2) is arranged at a small angle to the horizontal plane, the left side of the table as viewed from feed-out end of FIGURE 2 being raised above the right end.

A side gauge 102 is at the right side of the work table (FIGURE 2); the corresponding longitudinal side of the stacks of sheets rests against side gauge 102. Side gauge 102 is perpendicular to the tilted work table. A conveyor system 103 starts at tilted roller 104 adjacent the cutting position under knife assembly 105 and extends to horizontal roller 106. An idler roller 107 completes the circuit of the conveyor sheet 108.

A hood 110 is mounted above conveyor 103, covering up the external access to knife assembly 105 for safety purposes. Hood 110 is hinged at 111, providing a suitable protecting means with ready accessibility to the cutting position at the "feed-out" end of the machine. Hood 110 may be of sheet metal with transparent panes of glass or Plexiglas. A safety switch (not shown) is actuated by hood 110 when opened up, shutting off the electrical control circuits of the machine, stopping the action of the knife assembly 105 and of the other sections as well. Thus, the safety hood 110 prevents accidents to fingers of the operator since the knife and the machine are stopped when the hood is opened. In fact, an important aspect of the present invention is the provision of a fully automatic cutting machine, avoiding the need of an operator to readjust the stack at the cutting blade end between cutting cycles. A frame 112 extends from the main column 100 and serves to support conveyor assembly 103.

The cutting knife assembly 105 is shown in dotted lines, within the machine, in FIGURES 1 and 2. The general outline and correlation of the basic components of cutting mechanism 105 as seen in these figures is as follows:

The knife bar 115 is supported in suitable guides and carries the knife blade 116 at its lower cut-out section. Knife assembly 115, 116 is arranged at the angle with horizontal to coact normally with the work bed and stack carried at the same angle, for the purposes to be more fully described. Knife blade 116 is demountable from knife bar 115 for replacement or sharpening.

A front or knife clamp 117 is arranged contiguous to and behind knife bar 115. Suitable control means are operated on clamp 117 to press it down on the front sector of a stack of sheets in the machine just prior to cutting by knife blade 116. The stack of sheets is held firmly adjacent the transverse cutting position wherein the reciprocable knife blade 116 effects the transverse cut, as is understood by those skilled in the art. A suitable torsion bar 118 and hydraulic cylinder 119 are associated with the clamp 117 for its motivation, as more fully set forth hereinafter in the description of FIGURES 4 and 14. The exemplary knife assembly 105 is in the class known as guillotine cutters. Further details of this assembly will be shown and described in connection with FIGURES 3, 4 and 5.

The back gauge 120 traverses the machine along its full operating length in the longitudinal direction. It is secured to the work table (see FIGURE 3). Back gauge 120 incorporates a vertical frame 121 that pushes the end of the stack of sheets on the work table forward to cutting blade 116. The back gauge 120 of the exemplary machine incorporates a series of fingers 122 of the back gauge clamp. The back gauge clamp is seen in perspective in FIGURE 3 and in more detail in FIGURES 18, 19 and 20 and is described in detail under the heading "Back Gauge and Back Gauge Clamp." The fingers 122 of the back gauge clamp are seen in progression in FIGURE 1 in view of the tilt of the back gauge with the horizontal. Their function is to press against the top layer of the back end of the stack of sheets in the cutting machine and firmly grip the whole back end of the stack or stacks throughout the cycles of the cutting program.

An important feature of the invention cutting machine is the positive gripping and feeding of the stack of sheets, such as printed paper sheets, during the whole program of cutting in a manner wherein the stack remains aligned and the printed matter on all the sheets is cut squarely as predetermined. In other words, the positive gripping of the stack or stacks on the work table by the fingers 122 of the back gauge clamp and the resting of the side of the stack against tilted side gauge 102 eliminates "walking" of the sheets on the stack and its angular dislocation due to the front clamp action (117).

It is thus practical to arrange the loading of the stacks from the side of the machine 125 (FIGURE 1). This is more efficient in production as the stacks or piles to be cut into book pages or wrappers, etc. are long, such as 40″ to 60″. These stacks are slid along the horizontal side work table 126 and across to the work bed of the machine (150—FIGURE 3) all from the machine side 125. The operator and the controls for the machine are arranged at side 125 for the progress of the cutting program on the sheets. Control panel 127 contains the start 128 and stop 129 control switches for operating the pump of the hydraulic system.

Electrical panel 130 contains the switches for controlling the operation of the back gauge with control button 131 for the forward movement, control button 132 for the reverse movement, and control button 133 for stop. These controls in panel 130 are manual over-rides by the operator for the action of the back gauge independent of the automatic programming of the machine operation. Similarly, there are two over-riding controls for the action of knife assembly 105; electrical control 134 arranged at the left side of the machine and control 135 at the right side of the operating position. Either one of these switches 134, 135 over-rides the automatic programming action of the knife assembly 105 whereby the operator can actuate knife blade 116 into cutting whenever desired. Similarly, a pedal for operating the hydraulic action of the back gauge clamp is arranged at 136, and pedal for operator actuation of the front clamp 117 at 137.

For purposes of clarity of presentation and detail description of the novel contributions and features of the present invention, the start-stop back gauge programming system and control for the machine is not illustrated, as any specific or otherwise known programming system may be incorporated herewith. For example, a system per Patent No. 2,487,031 referred or of application Serial No. 571,518, filed March 14, 1956 (assigned to the same assignee as this case) may be employed. Further details of the overall electrical and hydraulic control systems for the individual machine components and their automatic and/or manual sequential or specific actuation are omitted to simplify the description, as such as apparent to those skilled in the art. Reference to the aforesaid patent application is made for a control system usable herein.

A safety hood 140 is provided over the work bed, the work thereon, and the back gauge 120. Hood 140 has a handle 141 to lift it out of the way when loading, unloading or otherwise by the operator. A safety switch (not shown) is actuated upon opening of hood 140, whereby all elements of the cutting machine are stopped from forward movement or actuation. This safety feature is important to the operator. A large panel of glass or Plexiglas may be arranged in hood 140 which is otherwise of sheet metal.

CUTTING MACHINE: MAIN OPERATING UNITS

FIGURE 3 is a perspective illustration of the exemplary embodiment of the cutting machine showing the essential operating units and their correlation. Details of the operation and mechanisms of the respective units described herein will be treated in more detail in further chapters and figures to be described. For the purposes of clarity of illustration in FIGURE 3, the protective hoods, the conveyor system 103, the side table 126, the main supports and housing of the machine, and the start-stop programming control unit have all been omitted from this figure. Also, a stack of stacks of sheets is not shown on the work table to simplify the illustration but will readily be understood by those skilled in the art.

(a) Tilted Work Table

The work table 150 is seen to extend from the rear of the machine (at the right—FIGURE 3) longitudinally through the machine to the "front" or feed-out end adjacent knife assembly 105. The rear of work table 150 is supported on a hollow frame member 151, in turn supported on main upright 101. The front end (left—FIGURE 3) of work table 150 is supported directly on the inclined surface 152 of main column 100. Work table 150 is comprised of a series of spaced parallel flat bars 155. The spacing between the bars 155 is substantially equal to the width of the bars in the transverse direction. In a practical embodiment, the transverse width of table bars 155 may be of the order of $\frac{1}{2}''$, $\frac{3}{4}''$, or $1''$; and the spaces between these bars of the same dimension as the selected bar widths. It will now be apparent that the work table area that the stack rides on has the order of 50% less frictional contact with the work bed as compared to a solid work bed of the prior art. Thus, the paper stack is pushed by the back gauge 120 along work table 150 with a substantially less frictional drag.

Also, it is important to note that cuttings and trimmings of paper and other debris, due to the operation of the machine on paper stacks, readily fall through the open spaces between the parallel bars 155 comprising the work table. The work table 150 is accordingly readily maintained clean, and has a reduced friction for the stack movements thereon. The solidity and effectiveness of work table 150, with spaced bars 155, for the purpose of supporting the stacks and for cutting by the knife assembly 105 is equally as effective as of prior machines, with the attendant advantages of reduced friction to the stack movements and a cleaner work bed. Such reduced friction to the movements of the paper stack on the work table further enhances the maintaining of the stack in its vertical alignment and minimizes any tendency of the stack to "walk" or otherwise distort when being operated upon. Another important purpose of the spaced bar work table 150 construction is to provide room for the lower movable members of the back gauge clamp.

A further important feature of work table 150 of the exemplary embodiment, seen in FIGURE 3, is its construction at an angle to the horizontal (e.g. to base line 153 constituting the bottom of main column 100). The work table 150 and the inclined surface 152 of column 100 upon which it is mounted are inclined at a fixed small angle to the horizontal plane of the machine, which angle we shall for purposes of reference refer to as $\theta$. In practice, the angle $\theta$ actually used may range from 1° to 20°, but this is optional. Even a small angle of tilt to horizontal for $\theta$ has been found to attain satisfactory results herein. In one practical embodiment $\theta$ equalled 3°.

The back gauge 120 and its associated back gauge clamp 122, 123 are movably mounted on work table 150 and parallel thereto at the same inclined angle to the horizontal. Similarly, the knife apparatus 105 including front clamp 117 and the knife assembly 115, 116 are mounted at the same angle $\theta$° to the horizontal plane, rendering the cutting blade assembly parallel to the surface of cutting table 150. The bottom cutting edge of blade 116 is further inclined to the horizontal to effect a guillotine type of cut.

(b) Back Gauge

The back gauge assembly 120 moves longitudinally of the machine and along the work table 150. The function, details and operation of the back gauge 120 and the associated back clamp 122, 123 is set forth hereinafter under the heading "Back Gauge and Back Gauge Clamp" in connection with the description of FIGURES 18, 19 and 20 thereof.

At this juncture, it is sufficient to state that the back gauge 120 comprises vertical pusher frame 121 that abuts the rear end of the stacked sheets. The frame portion 121 is segmented and projects through the openings in work table 150 between horizontal bars 155. A bracket 156 extends from the bottom of the back gauge, beneath work table 150, and is secured thereto.

The back gauge 120 is actuated along the work bed 150 in the forward and rearward direction through hydraulic cylinder 157 by piston rod 158 extending from cylinder 157 and a pantograph linkage 160. The pantograph 160 linkage between hydraulic cylinder 157 and back gauge 120 (at bracket 156) is an important feature in that it permits a long swing of the piston rod 158 to subtend the working excursion of back gauge 120 on work table 150. In a practical embodiment, such swing was 60''. It is to be noted that the hydraulic cylinder 157 is held horizontal and longitudinal of the machine, parallel to the direction of movement of back gauge 120. It is important to maintain piston rod 158 in a horizontal plane to prevent distortion and malfunctioning of its hydraulic drive for the back gauge. This is accomplished by pantograph 160 in a manner set forth in detail hereinafter in connection with the description of FIGURES 21 and 22 thereof, under the heading "Back Gauge Drive Mechanism."

(c) Back Gauge Clamp

The back gauge clamp comprises movable fingers 122, 122 projecting between the open spaces of the vertical bars of the pusher section 121 of back gauge 120. The fingers 122, 122 are operable in the vertical direction, within vertical frame 121, by means detailed hereinafter in connection with the description of FIGURES 18, 19 and 20 thereof, under the heading "Back Gauge and Back Gauge Clamp." A series of stationary fingers 123, 123 are located beneath the movable fingers 122, 122. The top surface of stationary fingers 123, 123 is a small distance above the plane of work table 150. The stationary fingers 123, 123 of the back gauge clamp are arranged in the interstices of bars 155, 155 of table 150 and are secured to a projecting portion of the back clamp structure 120.

When the movable fingers 122, 122 of the back gauge clamp are activated downwardly, they grip the tail end of the stack or stacks of sheets against the pusher surface 121 of the back gauge, pressing the stacks between the coacting pairs of fingers 122, 123. The intensity of force exerted by this clamp 122, 123 of the back gauge on the stack is made at least equal to, and preferably greater than, the intensity of force exerted by the front clamp 117 at the forward end of the stack. In other words, the clamp 117 used for cutting purposes at the front stack end must not be able to loosen the stack of sheets that is held by back gauge clamp 122, 123 under any conditions of operation. The back gauge clamp 122, 123 is arranged to exert a powerful grip and travels with the back gauge 120 forming, in effect, a travelling table for the paper stack as it is moved forward to the successive transverse cutting positions.

Thus, the stack or parallel stacks of sheets will not become distorted, and the printing on successive sheets will remain in accurate vertical alignment in all cutting operations by the knife 115, 116. As already stated, such clamping of the rear end of the stack permits the motivation of the back gauge, and the speed of the operating cycle between cuts to be faster than heretofore possible with practical commercial cutting machines. With the exemplary machine, there is no danger of distoring or "walking" of the pile of sheets; particularly in view of the combination of the back gauge clamp 122, 123 with the tilted work table. Such combination virtually secures the stack in proper operating alignment regardless of possible distortions due to speed of travel, deceleration of the stack or operation of the knife asembly 105 and its associated clamp 117. It also becomes unnecessary for the operator to remain at the feedout position of the work table at the cutting position for readjusting the stack that otherwise have become distorted.

The cycling and motivation of the back gauge, through hydraulic cylinder 157, is controlled in the usual manner for automatic cutting machines such as on a start-stop programming device (as described in Patents Nos. 2,487,031 and 2,053,499 or the referred to patent application) or otherwise.

The side gauge 102 extends perpendicular from the plane of work table 150 and the paper stacks rest against side gauge 102 due to the tilting of the table 150.

(d) Knife Assembly

The cutting knife assembly 105 is mounted adjacent the front or "feed-out" end of the machine. The vertical main supports 180, 181 for the cutting assembly 105 are secured to the inclined surface 152 of the main column 100. Guide supports 182, 183 for containing the movement of knife assembly 115, 116 and clamp 117 are secured to and otherwise bolted to the vertical supports 180, 181. The top beam 184 for the assembly 105 is supported across the supports 180, 183 as more clearly shown in FIGURE 4. The knife bar 115 is reciprocably mounted in the guide supports 182, 183 and actuated by a crank mechanism extending from the gear mechanism box 135. Details of the knife drive mechanism within gear box 185 are shown and described hereinafter in connection with FIGURES 6 through 13 and constitute important features of the present invention.

A draw bar 186 extends from a crank within gear box 185 and is linked to ear 187 extending from knife bar 115 through link 188 pivoted at 189. The opposite end of knife bar 115 is pivotally supported from the top cross beam 184, through link 190 connecting rear ear 191 of knife bar 115 to the pivoted end 192 of beam 184. Pivot 192 is preferably a bearing surface, to minimize friction; as is the pivot 193 between link 190 and the knife bar. A heavy spring 195 is mounted within a cavity of cross beam 184 and arranged in a further linkage to the knife bar 115, including elements 196, 197, 198 and 199 shown in more detail in FIGURES 4 and 5 hereinafter.

The purpose of the heavy spring 195 and its associated linkages with knife bar 115 is to normally bias or otherwise maintain knife bar 115 in its upward, non-operative position. In other words, spring 195 is arranged to keep the knife blade 116 in knife bar 115 normally at all times when non-operating in the upward position so as not to cause injury to the operator or stack should any component of the knife mechanism 105 or other part of the drive become broken or inoperative. Further advantages and details of this construction are set forth hereinafter.

Actuation of the knife draw bar 186 by the crank mechanism in gear box 185 is on a cyclic basis under the control of the start-stop programming system. The hydraulic cylinder 119 for actuating front clamp 117 is seen in dotted lines in FIGURE 3. Cylinder 119 is supported in cross-beam 184. The torque bar 118 is connected to front clamp 117 for the purpose of keeping the clamp in the position parallel with the work table 150 under all clamping operations despite the thickness or height of the stack of sheets. Further details of the operation of torque bar 118 and its associated mechanism are shown and described in connection with FIGURES 14 through 17 hereinafter under the heading "Front (Knife) Clamp System."

(e) Ejector Mechanism

At the forward or feed-out location of the cutting machine is located an ejector mechanism whereby the last remaining portion of the stack is mechanically moved forward from the work table 150 into the conveyor 103 (FIGURES 1 and 2). The ejector is illustrated in detail and described in connection with FIGURES 23 and 24 hereinafter under the heading "Ejector Mechanism." Shown in dotted lines in FIGURE 3 is a shaft 215 rotatably supported in the frame of the machine. A pulley 216 is secured to shaft 215. A cable 217 is arranged to rotate shaft 215 counterclockwise when pulled downwardly by actuating bar 218. Actuating bar 218 is pivoted at 219 and is controlled by means as shown in FIGURES 23 and 24 to operate downwardly when the back gauge is moved to a predetermined position at the end of the program of cutting.

Rod 218 may be actuated electrically through a solenoid or mechanically by a suitable element under the control of the position of the back gauge after the last cut on the stack. The downward movement of cable 217 when effectuated rotates shaft 215 and the series of spaced fingers 220 secured to rod 215. The ejector fingers 220 are positioned to be moved between the spaces of bars 155 of table 150 and engage the end portion of the cut paper stack. It moves such stack portion outward of the machine into the conveyor 103.

The position of the back gauge for actuation of lever 218 and the ejecting mechanism herein is preferably when the back gauge is already in its return rearward movement and has already moved back toward its starting position by a predetermined amount. Actuation of lever 218 and ejecting fingers 220 will thus operate upon the last portion of the cut stack without interference from the back gauge 120 and back gauge clamp 122, 123. The ejector is operated after the last cutting stroke of the knife assembly 105 and when the clamp 117 and knife 115, 116 are in their upward position. The remaining stack portion is moved forward out of the machine. The back gauge, when at a predetermined further position in its return movement, de-energizes the ejector actuating lever 218. The spring biased cable 217 thereupon returns to the initial position, as indicated in FIGURE 3.

The machine of FIGURE 3 is further strengthened by cross-bars 221, 222 at 223 at the back side portion forming triangular strut 224. Further cross bars 225 and 226 strengthen the vertical structure between the main vertical supports 100, 101. Additional strengthening struts and cross bars, supporting members and the like are, of course, optional. The location of the mechanical, electrical and hydraulic control elements are a matter of choice, as are the locations of the control levers, pedals and switches. The desired housings, protective hoods and protective switching may take many forms as is understood by those skilled in the art. However, as hereinabove set forth, the advantageous features and arrangements of the present invention result in a practical cutting machine with side loading (from side 125) and with all operating electrical and hydraulic controls at such side.

The cutting machine herein described in connection with FIGURE 3 is to be understood to be comprised of these essential operating elements, operating alone or in the normal combination, to afford the results set forth hereinabove. It is to be understood that principles and features of the units shown herein are for exemplary purposes and subject to variation and modification by those skilled in the art without departing from the spirit and scope of the disclosed features.

KNIFE OPERATING ASSEMBLY

A number of novel features are incorporated herein for the knife operating assembly and mechanism. FIGURES 4 and 5 illustrate the knife assembly. The exemplary knife 115, 116 is reciprocable and arranged perpendicular to the table 150 for the stack of sheets to be cut along predetermined transverse lines. One side, the right edge (FIGURE 4), of the knife blade 116 is somewhat closer to the work bed 150 in order to effect the well-known guillotine action of cutting. The knife assembly is seen extending from the top surface 152 of the main support 100. The surface 152 is at the angle θ to the horizontal base 153 of support 100 that rests on the ground. In other words, the knife assembly 105 and work table 150 supported on surface 152 of base 100 are arranged at the predetermined angle θ to the horizontal, corresponding to the selected angle of work table 150 described hereinabove.

The side upright members 180, 181 extend from the surface 152; and the vertical guide bars 182, 183 are supported by the inside faces of supports 180, 181 as already described in connection with FIGURE 3. The front or knife clamp 117 is shown in its upward position (solid lines at top, FIGURE 4). The hydraulic cylinder 119 that actuates clamp 117 in its vertical or reciprocal traverse is connected to clamp 117 through the piston rod 119a. The bottom edge 117a of the clamp 117 is shown in dotted lines (FIGURE 4), representing a possible position for the bottom of the clamp 117 when juxtaposed against the top of a stack of sheets when held between the clamp and the work bed 150.

It is to be understood that actuation of front clamp 117 by cylinder 119 is effected just before the cutting stroke by knife blade 115, 116 on the stack. The purpose of the clamp is to maintain a forceful constant pressure on the stack just prior to, and during, the full cutting cycle by the knife assembly 105 and is thereupon released to its upward position above the paper stack. Such release of clamp 117 permits the back gauge to move the stack forward through the underside of the clamp 117 and knife blade 116 during the movement portion of the cycle prior to the next cutting position on the stack. Control of the clamp hydraulic cylinder 119 is effected by the control system for the machine, duly synchronized with the other machine motions.

At the right side of the machine in FIGURE 4 is seen a housing 230 that is an extension of the main upright 100 and contains an oil supply and a pump mechanism 231 for the purposes herein, as understood by those skilled in the art. To the rear of oil housing 230 is the drive gear mechanism housing 185 for the knife assembly 105, seen more fully in FIGURE 3. The draw bar 186 extending from the gear box 185 is used to reciprocate the knife bar 115 into its downward cutting stroke. The described linkage of the knife bar 115 at both of its ends and to cross beam 184 permits a proper reciprocating stroke for the knife bar 115 to effect the guillotine cutting action by the knife blade 116 supported in the knife bar 115 by suitable fastening, such as bolts 232.

As previously stated, the large helical spring 195 located between the pivotal plates 198, 199 and connected to the linkage 197 to the knife bar at ear 187 affords the upward biasing action on the knife bar 115. This action by spring 195 serves to keep the knife bar 115 and its associated blade 116 in the upward position when the driving mechanism for the knife 115, 116 is not operating or is defective. Further details of this arrangement are set forth in the drawing of the knife operating assembly, FIGURES 5 and 5A.

Referring to FIGURES 5 and 5A, it is seen that reciprocable knife bar 115, riding in knife bar guides 182, 183, is pivoted in the fixed top beam 184 and its pivotal points 193 and 202. Projecting ear 191 of knife bar 115 is thus pivoted with respect to the fixed bearing 192 in beam 184 through link 190 and its associated pivot or bearing 193. The opposite projecting ear 187 of knife bar 115 is also pivoted in stationary top beam 184 at pivot 203 through linkage 197 coupled to portion 196 pivoted in bearing 202 of the knife bar 115. The reciprocating motion of the draw bar 186 from the drive mechanism is transmitted to the knife bar at ear 187 across the link 188 connecting ear 187 with the draw bar 186, across bearing pivot 189. As the draw bar 186 is pulled downwardly (in FIGURE 5) the knife bar 115 and its associated blade 116 are moved downwardly along the guide bars 182, 183.

The arm 204 of link 197 thereupon presses the spring 195 by moving the end plate 198 and its associated cylinder 200 toward the pivotal plate 199 and telescoping over its associated cylinder 201. Plate 199 has extending ears 205 which pivots at 206 to an internal portion 207 of top beam 184. Similarly, projecting ears 204 from plate end 109 affords a pivot at 209 with the arm 208 of linkage 197 as seen in FIGURES 5 and 5A. Thus, when the knife blade 116 moves downward as the draw bar 186 is pulled downward, the blade 116 approaches the top 150a of the work bed and reaches the position 150a after cutting every sheet in the stack on the work bed 150. The extent of the stroke of the knife bar 115 is thus predetermined by the mechanism herein, and its adjustments, as will be understood by those skilled in the art.

The main drive gear 210 is indicated schematically in FIGURES 3 and 5 and is seen in the cross-sectional view (FIGURE 6) of gear box 185. The main crank shaft 211 is secured to and otherwise directly driven by the main gear 210. At the extending end 211a of the crank shaft is secured a crank arm 212. The terminal 214 of the draw bar 186 is operatively connected to crank 212 through crank pin 213. Accordingly, a 360° revolution of main gear 210 effectuates a pull-down stroke and return stroke of the pull-bar 186, correspondingly actuating the knife bar 115 downwardly with its knife blade 116 against the surface 150a of the work bed. It is to be understood that the knife bar 115 is also counter-balanced by the spring 195.

The actuation of the main gear 210 into a single cycle revolution (360°) is under the control of the master start-stop programming device and is effected: after the back gauge has been stopped in the next cutting position; the knife clamp 117 has been moved down against the back to hold the front portion firmly for cutting; and the actuation of the knife drive apparatus occurred, as described hereinafter in connection with FIGURES 10 through 13. The stack of sheets are thereupon cut in guillotine fashion by the inclined blade 116 when the draw bar 186 linked to the knife bar 115 has executed its downward movement in the single cycle of rotation of the main gear 210.

The knife bar 115 and its associated blade 116 is returned directly to its upward position, through the inertia of the system and its balancing spring 195. Also, during the cutting cycle herein described, the back gauge clamp 122, 123 maintains a firm grip on the stack as set forth, with a pressure equal to or greater than that exerted by the front clamp 117. Associated with the main drive gear 210 is the knife control mechanism 260. The knife control mechanism 260 is illustrated in detail, and in enlarged views, in FIGURES 7, 8 and 9 is thoroughly described under the heading "Knife Control Mechanism."

The purpose of the knife control mechanism 260 is to ensure a single cycle of operation of the main gear 210 and the knife 115, 116 for each cutting impulse from the programming system and to assure a non-repeating actuation of the knife assembly 105 and its associated gear 210 upon such single impulse. Furthermore, the system 260 affords a shock-absorbing function due to the inertia of the drive gear 210 in its rotation and operation of the knife bar 115, through a dash pot and a lug that is secured to the face of main gear 210. The function of the mechanism 260 as detailed in FIGURES 7, 8 and 9 is essentially for safety, and provides a novel addition to the cutting apparatus 105 for the herein or other reciprocable cutting mechanism.

FIGURE 6 shows the internal mechanism within gear box 185 already referred to hereinabove and shown in FIGURES 3 and 4. The crank shaft 211 is rotatably supported in the sides of box 185, through anti-friction bearings 234, 235. The main drive gear 210 is firmly secured to the tapered crank shaft 211 as heretofore stated and engages the pinion 236. Pinion 236 is splined to the intermediate shaft 237, in turn supported in gear box 185 by anti-friction bearings 238, 239. Pinion 236 extends into the over-running clutch 240 at the inner race thereof. Pinion 236 is integral with the inner race of the over-running clutch 240.

Over-running clutch 240 permits the rotation of pinion 236 and its associated main drive gear 210 only in the desired single direction. The outer clutch face 241 slips in its relation to main gear 210 should a reverse direction of operation be attempted. The intermediate shaft 237, secured to the inner race of over-running clutch 240, extends to the right (FIGURE 6) outside gear box 185 to a second over-running clutch 244 mounted on the exterior of gear box 185. Intermediate shaft 237 is thus connected to the inner races of both the over-running clutches 240 and 244. The outer race of outer clutch 244 is secured to the gear case housing 185. The outer face of the inner over-running clutch 240 is secured to an integral gear 242. Gear 242 engages pinion 243, that is an integral part of main drive shaft 245. Main drive shaft 245 is rotatably supported in the gear box housing 185 through anti-friction bearings 246, 247.

Main drive shaft 245 extends to the left (FIGURE 6) through the gear box 185. On the extending end of main drive shaft 245 is rotatably supported a fly wheel 250, as is shown in cross-sectional view, FIGURE 10. A pulley 251 is incorporated in the hub of fly wheel 250 in order to effect a pulley belt drive of the main shaft 245 through stabilizing fly wheel 250 rotatably supported on shaft 245. A suitable electric motor drive (not shown) rotating the belts on the pulley 251, affords the drive on fly wheel 250, and the main drive shaft 245 on a continuous basis. Extending further to the left (FIGURE 6) of main drive shaft 245 and fly wheel 250 is the drive apparatus 255 for controlling the drive of the main shaft 245. The apparatus 255 is described in detail under the heading "Knife Drive Apparatus," as illustrated in FIGURES 10 through 13.

Summarizing the action of the mechanism within housing 185 shown in FIGURE 6: The main rotative power or energy for actuation of the knife blade is imparted to the fly wheel 250 through its pulley hub 251. The main drive shaft 245 is operated intermittently through the clutch-brake control apparatus 255 shown in detail in FIGURES 10 through 13. Upon a control signal actuation from the start-stop programming mechanism referred to, the clutch brake drive apparatus 255 is energized to transmit the flywheel rotational energy 250 to the drive shaft 245. The shaft 245 transmits the rotational energy through its integral pinion 243 to the gear 242 constituting the outer casing of overrunning clutch 240. The intermediate shaft 237 is thereupon motivated, as it is secured to the pinion 236 that, in turn, is formed integrally with the inner race of over-running clutch 240. Pinion 236 drives the main gear 210.

The crank arm 212 is motivated by gear 210 through the crank shaft 211 secured thereto. The crank arm 212, being pinned through pin 213 to the linkage 214 attached to the knife pull bar 186, causes the knife to be "pulled" down. The knife bar 115 and its associated knife blade 116 are normally biased to their inoperative or upward position by the large spring 195 (FIGURES 3 to 5). The gearing action described herein has the function of pulling the knife down to perform the cutting action on the stack of sheets.

As lower or dead center of the main crank 212 is passed, the knife bar 115 will be pulled upward by the spring 195. In this manner, the crank 212 and its associated crank shaft 211 and main gear 210 are freed from the flywheel drive 250, through the over-running clutch 240. Thus, the flywheel 250 is free to stop at any point beyond the lower dead center position of the crank 212 as long as it does not overrun the knife bar 115 after the knife has reached its uppermost position.

The construction described herein has two main advantages. First, from the safety viewpoint, in case of any failure of the linkage in the mechanism between the flywheel 250 and the knife blade 116, the knife will always stay up. This advantage is important as the knife 115, 116 will not come down unexpectedly and cut whatever is in its path. It is safety for preservation of the stack of sheets, as well as of operator's hands. In other words, it is ensured that the knife blade 116 will remain up and out of the way should any part of the drive or the linkage between the drive and the knife bar 115 become inoperative or broken or for any reason.

Another important advantage in the described construction is that the brake in the drive mechanism 255 can effectuate its braking action on the drive shaft 245 over a latitude of almost 180° in stopping location. In prior arrangements, the stopping location of a brake on the drive shaft for a knife cutter was in the range of 2° or 3° as it was necessary to pinpoint the position of the knife in its upper position for the brake to be activated and hold the drive shaft and therefore the linkage to the knife from moving. Since the biasing spring 195 and the linkage associated therewith to the knife assembly 115, 116 acts to keep the knife assembly in its upper position independent of the drive, the brake can institute its action along a 180° return swing of the knife blade and crank 212 and its associated gear 210.

Since the over-running clutch permits the crank 212 and its drive gear 210 to move ahead, with the knife assembly 115, 116 moving up faster than the drive through shaft 245 would impart (due to spring 195), the braking action between the fly wheel and the drive shaft 245 that occurs in mechanism 255 (as described in detail in connection with FIGURE 10), need not pinpoint the uppermost position of the knife assembly 115, 116 as will now be understood by those skilled in the art. It may effect its braking action on the drive shaft 245 independently of the upward swing of the knife assembly 115, 116. Also assisting in this freedom of the brake to stop the drive shaft 245 is the single cycle non-repeating mechanism 260 for the control of the knife operating assembly 105 to be described hereinafter in connection with FIGURES 7, 8 and 9 under the heading "Knife Control Mechanism." The over-running clutch 244 operating at the end of intermediate shaft 237 is used to be able to stop the knife assembly 115, 117 at any point in its downward stroke. It has a "no back" action when the clutch is disconnected and before the brake takes hold. It prevents any upward jerk (during that small interval) due to the biasing spring 195.

"KNIFE CONTROL MECHANISM"

FIGURE 7 is an enlarged view, in elevation, of the safety control mechanism 260, effecting a single cycle non-repeat action of the cutter assembly 105 upon a control signal from the programming device. The mechanism 260 is associated with the main drive gear 210 as seen in FIGURE 5. It comprises a dashpot 261 having a projecting plunger 262. The dashpot assembly 261, 262 is supported by an arm 263. The dashpot arm 263 is pivotally secured to intermediate shaft 237 through bushing 264, as seen in FIGURES 6 and 7. The control mechanism 260 is arranged within the gear box housing 185 with the dashpot 261 under oil near the bottom thereof.

In its normal position, shown by solid lines, the dashpot 261 is arranged to have its plunger 262 abut a lug 265 that extends from a predetermined sector of the main drive gear 210. Thus, should the knife assembly 105 tend to overshoot a single cycle, and tend to cause the knife unit 115, 116 to return downwards to the cutting position without a signal therefor, lug 265 on main gear 210 will abut plunger 262 and the dashpot 261 will absorb the impact and stop the knife assembly. Such safety feature is utilized to avoid an unintended operation of the knife assembly 105. Means are provided for withdrawing the plunger 262 from its abutting relationship with gear lug 265, upon signal energization of the drive mechanism to initiate a cutting cycle of the knife assembly 105. The mechanism 260 is provided for this purpose, and for other advantageous features, now described in connection with FIGURES 7, 8 and 9.

As heretofore stated, dashpot 261 is tiltable downwardly in accordance with the dotted arrow $a$, namely in a clockwise direction (FIGURE 7). When it is desired to free the main gear 210 for executing a cutting cycle of the knife assembly 105, dashpot 261 is swung downwardly to remove the plunger 262 from the path of gear lug 265, to the dash line position 261'. The dash line position of the components of mechanism 260 indicate its "out of the way" position wherein the gear 210 is permitted to execute its knife operation cycle throughout a single 360° turn.

Means are provided to ensure the return of the dashpot 261 to the original or solid line position in abutting relationship with lug 265 before the completion of a 360° turn of main gear 210. The actuation of the dashpot 261 to the out of the way dotted position 261' is initiated when the front or knife clamp 117 is energized into clamping action. In other words, at the end of the programmed stop of the back gauge forward movement, the front clamp 117 is energized towards its clamping action at the same time the mechanism 260 is actuated for removing the dashpot 261 and the plunger 262 from the path of the gear lug 265. Solenoid means and associated crank mechanism, in circuit with the signal circuit for the front clamp 117, effectuate the herein stated displacement of dashpot 261, as set forth in connection with the description of FIGURE 9 thereof.

The resultant action is to rotate the crank shaft 266 (FIGURES 7 and 9) by a predetermined amount in the clockwise direction as indicated by arrow *b*. A crank lever 267 is secured to crank shaft 266 by key 268. Crank lever 267 is pinned to link 270 by pin 271. The lower portion of link 270 is pinned to latch 275 by pin 272. Latch 275 is pinned to the main housing 185 by means of pin 273. With the rotation of crank shaft 266 in the direction of arrow *b*, the linkage 267, 270 raises the pinned end of latch 275 and moves the latch in the counterclockwise direction of arrow *c*, to the dashed line 275'. The cam tip 276 of latch 275 is thereupon moved to the out of the way position 276', wherein the dashpot 261 is moved to its dotted out of the way position 261' in the event lug 265 abuts its plunger 262.

As hereinabove stated, actuation of the solenoid means (FIGURE 9) to operate crank lever 266, and in turn move the latch cam tip 276 to its out of the way position 276', is all initiated preferably upon the energization of the front clamp 117 just prior to the cutting stroke. However, it is to be understood that the exact point of actuation of mechanism 260 to the non-abutting position of dashpot 261 is optional within the principles herein. For example, such energization of the solenoid (FIGURE 9) to operate crank shaft 266 may occur coincidentally with the energization of the clutch driving means 255 (FIGURE 10) that in turn starts the gear drive for main gear 210 to operate the draw bar 186 for "pulling down" the knife bar 115 to effect the cut on the stack by blade 116.

In any event, as the main gear 210 executes its cutting cycle in the clockwise direction, arrow *d*, the lug 265 is not impeded by the plunger 262 as the cam tip 276 of latch 275 is out of the way at position 276', permitting the dashpot 261 to be in its out of the way position 261'. As the main gear 210 continues its rotation along direction *d*, at some intermediate point lug 265 abuts the roller 277 pinned by pin 278 to an extension 279 of dashpot arm 263. This action ensures a positive replacement of the dashpot 261 to its solid and lug-abutting position 261. It is noted that a counterweight 280 is secured to the extension 279 of arm 263, and normally tends to raise the dashpot to its abutting position 261. However, should its action be sluggish or slower than the cycle of rotation of gear 210, the lug 265 abutment ensures the dashpot relocation to position 261 through the lug 265 impact on roller 277 as herein set forth.

Means are provided in the cranking mechanism to be described in connection with FIGURE 9, to also reset the linkage 267, 270 and the latch 275 to its normal abutting solid line position of FIGURE 7 after the initiation of the cutting cycle. Nevertheless, the mechanism 260 as seen in FIGURE 7 contains a safety resetting of the latch 275, before the completion of the rotation of the main gear 210, as will now be described. An armature 281 is secured to the crank shaft 266. Armature 281 contains a screw 282 at its tip end, maintained in its adjusted position by lock nut 283. The screw 282 is abutted by a roller 285 which is on the main gear 210. Roller 285 is in the position 285', abutting the armature 281' in its dashed line position. As it proceeds clockwise to the dotted position 285", the roller has moved the armature 281 to its return or solid line position. In this manner the crank shaft 266 is assured a return to its normal repeating position as shown in solid lines, and remains in this position until the crank shaft 266 is again motivated by the solenoid apparatus of FIGURE 9.

The phasing of roller 285 on gear 210 is such that the roller 285 approaches its armature resetting position 285' during the downward stroke action of the knife bar 115. Thus, roller 285 returns the latch 275 in a positive manner to its locking position behind dashpot 261. This is a safety feature in case there is binding in the solenoid linkage between the mechanism of FIGURE 9, crank shaft 266 and links 267, 270, which binding may be too large for the springs of FIGURE 9 to overcome. In other words, on the downward stroke of the knife assembly 105 the safety mechanism 260 is set up by camming action, in addition to the normal spring forces which would actuate the safety movement of latch 275 just before the action of roller 285 on armature 281 may otherwise be effected. Should the latch be reset in the normal way by the spring of the mechanism of FIGURE 9, the armature 281 will be in its solid line position of FIGURE 7, out of the way of roller 285.

Crank shaft 266 extends through the gear box 119 and is fastened to an outside crank lever 286. Lever 286 is secured to crank shaft 266 by key 287, with the crank lever 286 in its normal position, as shown in solid lines in FIGURE 9. The crank shaft 266 is in its normal position for maintaining the latch 275 in the dashpot abutting position as shown in solid lines in FIGURE 7. The position of the crank lever 286', shown in dashed lines in FIGURE 9, is effected by a clockwise displacement of lever 286 along the direction of dotted arrow *e*. Actuation of crank lever 286 to the actuated position 286' is effectuated by energization of the solenoid 288.

As heretofore stated, energization of electrical solenoid 288 is preferably performed in synchronism with the energization of the hydraulic circuit including cylinder 119 that motivates the front clamp 117 against the stack to be cut. Upon energization of solenoid 288, its plunger 290 is projected against the roller 291 pinned to the end of crank lever 286 by pin 292. Plunger 290 moves downward against the roller 291 until its maximum extension, as seen in dotted position 290', with the roller in the dotted extended position 291'. Thus, the turning of crank lever 286 to the position at 286' along the arrow *e*, simultaneously actuates crank shaft 266 to effect the latch 275 releasing action on the dashpot 261 (FIGURE 7).

Towards the end of its downward stroke to position 286', the crank lever 286 actuates a micro-switch 295. This occurs through the abutting screw 296 extending from lever 286 impinging upon pin 297 of the electrical switch 295. Micro-switch 295 is mounted from a bracket 298 extending from the framework 299 of the machine. The control leads 300 of switch 295 are preferably arranged to close the circuit of the operating clutch in apparatus 255 and simultaneously deenergize the brake therein, to effect the driving of the main gear 210 from the flywheel 250, as described in connection with FIGURE 6, and cause the knife mechanism 105 to be operated. Thus, provision is made that the knife mechanism 115, 116 cannot be operated until the plunger 262 (corresponding to the usual safety pin) is removed from its abutting position shown in FIGURE 7.

Summarizing, the actuation of plunger 291 by the energization of solenoid 288 effects a turning of crank lever 286, to in turn operate crank shaft 266 to remove the latch 275 from effectively impeding the dashpot 261, permitting the plunger 262 to avoid abutting the lug 265 on the main drive gear 210 upon the instituting of a cutting cycle. The main drive gear 210 is rotated through the gear box mechanism at 185 by permitting the energization of the clutch in apparatus 255 to drive the drive gear 245 when the micro-switch 295 is "closed" by the crank lever 286. It is to be understood that the micro-switch 295 acts rather as a relay to "permit" current already otherwise directed to the clutch and brake for the operation herein stated to be operative. The actual control signal and supply of energization current to the clutch and brake for the purposes described is under the control of the master start-stop programming mechanism, referred to hereinabove, and also by the control switch 305 to be described in connection with FIGURE 8.

The relay switch 295 is actually in the nature of a safety device since it will prevent the knife mechanism 105 from operating by preventing the current from actually entering to energize the clutch and to de-energize the brake in apparatus 255 unless the crank lever 286 is in its lower distended (dotted) position 286' (FIGURE 9), wherein the abutting latch 275 is moved to permit the lug 265 on main gear 210 to pass dashpot 261. A spring 301 extends from frame bracket 298 and abuts the bottom portion of crank lever 286, biasing lever 286 normally against the plunger 290 of solenoid 288. Thus, when the signal to solenoid 288 is removed, spring 301 presses the crank lever 286 back to its original position shown in solid lines in FIGURE 9, and the plunger 290 of solenoid 288 is similarly returned.

The positive return of lever 286 motivates the crank shaft 266 in the direction opposite to the dotted arrow e in FIGURE 9 and correspondingly opposite to the motivating direction of dotted arrow d of FIGURE 7. This serves to reset the mechanism 260 to the original position shown in solid lines in FIGURE 7, wherein the latch 275 is in the position whereby its cam tip 276 will abut the dashpot 261, and plunger 262 will prevent the main gear 210 from continuing its rotation once the lug 265 engages plunger 262. As hereinabove stated, should the spring 301 or the intermediate linkages fail to return latch 275 to its normal position (as seen in FIGURE 7), the roller 285 on gear 210 will perform this function by displacing armature 281 back to its normal position and carry the crank shaft 266 with it.

FIGURE 8 illustrates a further electrical switch 305, having leads 306 that are placed in circuit with the clutch and brake coils of apparatus 255 incorporating the drive for the gear box 185. The switch 305, when actuated in the manner to be described, is arranged to de-energize the clutch and re-engage the brake, in the drive apparatus 255. This is accomplished when the main drive gear 210 has executed a little more than half of its revolution and thus the driving actuation on the main shaft 245 through apparatus 255 is initiated to a stop.

FIGURE 8 shows one means of accomplishing the cycling of such stopping of the drive from apparatus 255 to the main shaft 245. A lever 307 extends from switch 305 and is pivoted at 308 in the switch. An abutment end 310 is provided at the end of switch lever 307 and is arranged in the path of gear 210 to abut the crank arm 212 in its cycle.

The position of switch abutment member 310 is such that the lever 307 will be moved downward in the direction of arrow f when the crank arm 212 abuts member 310 as it executes its clockwise rotation (shown by arrow g). The position of the switch 305 is such that it is "engaged" through such abutment when the main gear 210 is rotated approximately one-half of a revolution in its 360° cycle. The operation of the switch 305 directly, or as a relay, in the circuits aforesaid for the clutch and brake, and with the main programming start-stop mechanism, is in accordance with standard practice and will be understood by those skilled in the art. The features and accomplishments of the described system and arrangements afford the novel advantages set forth herein.

KNIFE DRIVE APPARATUS

FIGURE 10 is a cross-sectional view through the knife drive apparatus 255 associated with main drive shaft 245 and flywheel 250. Reference is made to FIGURE 6 for the relationship of the drive apparatus 255 to gear box 185, including intermediate shaft 237 and main drive gear 210. The flywheel 250 is continually motivated by V-belts 310 coacting with the pulley hub 251 of flywheel 250. It is to be understood that the V-belts 310 are driven from a prime drive, such as an electric motor (not shown), when the main machine is in connection for operation.

During connection for operation of the cutting machine, the flywheel 250 is in continuous rotation, freely about the main drive shaft 245, about anti-friction bearings 311, 311. Rotation of main drive shaft 245, for the purpose of actuating the knife assembly 105, through the mechanism within gear box 185 is accomplished by the drive apparatus 255 between the hub face 312 of flywheel 250 and the extension of shaft 245 as will now be described.

Drive apparatus 255 essentially comprises an overload mechanism 315 adjacent hub face 312 of flywheel 250, an electromagnetic clutch 316 between overload mechanism 315 and drive shaft 245, and an electromagnetic brake 317. The overload mechanism 315 is described in detail hereinafter in connection with FIGURES 11 and 12 thereof. The function of overload mechanism 315 is to effect a direct drive between flywheel 250 and clutch 316 but to interrupt the energization of clutch 316 and brake 317 when for any reason a mechanical overload condition occurs in the driven knife system.

Thus, should the knife assembly 105 become impeded in its operation, actuation thereof through clutch brake 316, 317 to main drive shaft 245 will automatically cease. Clutch brake 316, 317 may be of any suitable type such as a "Warner" clutch brake system wherein the electromagnetic windings of both the clutch and brake are arranged to be stationary. Cross-sectional FIGURE 10 corresponds to such a clutch brake. The clutch coil 320 of clutch 316 is stationary and secured to stationary structural member 321. Coil 320 is energized by suitable electrical means through leads 322 at the proper cyclic relationship to knife cutting.

Energization of clutch coil 320 causes rotating field member 323 to be magnetically activated. Rotating field member 323 is secured to overload mechanism 315 through projecting hub 324 of field member 323 and screws 325 to the hub 326 of the overload mechanism 315. Since overload mechanism 315 rotates with flywheel 250, it will be understood that field member 323 is carried into rotation about shaft 245 by flywheel 250. Armature plate 327 of clutch 316 is attracted into full frictional engagement with the magnetized rotating field member 323, upon energization of the clutch coil 320. Armature 327 is, in turn, secured to drive shaft 245 as is shown in detail and described in connection with FIGURE 13. Armature plate 327 is secured to splined hub 330 through projecting lugs 328 and suitable screws 329.

FIGURE 13 is a sectional view through the connection of clutch armature 327 to main drive shaft 245, taken along the line 13—13 in FIGURE 10 as viewed in the direction of the arrows (to the right). Splined hub 330 is in mesh with a splined sleeve 331 that in turn is keyed to drive shaft 245 by a key 332. Drive shaft 245 accordingly rotates at the same speed and in the same direction as flywheel 250 whenever clutch coil 320 is energized. During such clutch energization, under normal load conditions, the flywheel 250 directly motivates rotating field member 323 through overload mechanism 315 and armature ring 327 is attracted into frictional engagement with rotating member 323 to, in turn, directly drive the main drive shaft 245 through the splined hub 330-sleeve 331 connection thereto.

During normal de-energization of clutch 316, the electromagnetic brake 317 is also de-energized. Brake 317 has a stationary field coil 335 connected to the electrical circuit through leads 334. The stationary field coil 335 is secured to stationary machine member 336. Included in field ring 333 are a number of powerful Alnico magnets (not shown). These permanent magnets create a field through the stationary magnetic member 337 of brake 317. This field attracts rotatable brake armature plate 338 in frictional engagement therewith, as is understood by those skilled in the art.

The brake armature 338 is secured to the main drive shaft 245 through lugs 339 on splined hub 330, and suitable fastening means as screws 340. Thus, whenever clutch coil 320 is de-energized, the brake coil 335 is likewise de-energized and brake armature ring 338 is kept attracted against stationary brake field member 337 through the permanent Alnico magnets. The main drive shaft 245 is thus held against rotational displacement by brake 317. The knife assembly 105 and the gear box 185 are stationary while the coil brake 316, 317 remains de-energized as will now be understood.

However, upon the requirement for the knife assembly 105 to be actuated, the main drive shaft 245 is rotationally activated as follows: The clutch coil 320 and the brake coil 335 are simultaneously energized through their respective leads 322 and 334. Clutch armature 327 thereupon becomes frictionally engaged with rotating field member 323 of clutch 316, and drive shaft 245 becomes directly coupled with flywheel 250, through overload mechanism 315. Energization of brake field coil 335 creates a magnetic field that counteracts the magnetic field normally set up by the Alnico magnets therein. The brake armature 338 is thereupon instantly released from engagement with stationary brake field member 337. The drive shaft 245 is thus rotated by the simultaneous engagement of clutch 316 and release of brake 317. Shaft 245 is rotated by the flywheel 250 at the same speed and direction as the flywheel.

When it is desired to stop drive shaft 245, the electrical energy to the clutch-brake 316, 317 is interrupted (at leads 322, 334). When the current is interrupted to brake field coil 335, the Alnico magnet magnetic force draws the brake armature plate 338 into frictional contact with the brake stator plate 337. Since the brake stator plate 337 is secured to stationary structural member 336, the drive shaft 245 will thereupon come to an immediate stop. At the same instant that the Alnico brake field is de-energized, the clutch coil 320 is also de-energized. The clutch aramture plate 327 is thereupon released from rotating field member 323. The flywheel 250 is thus freed to rotate, having no effect upon the rotation of drive shaft 245.

In summation, whenever it is required to activate the knife assembly 105 into a cutting stroke, the electrical circuit is arranged to simultaneously energize the clutch coil 320 and brake coil 335 through their respective leads 322 and 334. Activation of clutch brake 316, 317 thereupon effects a direct mechanical connection between the flywheel 250 and the drive shaft 245 through the intermediary overload mechanism 315. The drive shaft 245 is practically instantly activated into rotation. De-energization of the clutch coil 320 and brake coil 335 likewise instantly disconnects the flywheel 250 drive to the shaft 245, the brake 317 causing practically instant stoppage of drive shaft 245. The energization and de-energization cycling of the clutch brake 316, 317 is associated with the requirements of the cutting assembly 105 and instituted by the master star-stop program system.

Reference is now made to FIGURES 10 to 12 for the description of the operation of overload mechanism 315. The overload mechanism 315 comprises a hub 326 that rotates freely about drive shaft 245, on anti-friction bearings 345, 345. Two plates 350, 350 are firmly secured to hub 326. A plate 351 is in turn secured to each plate 350 by screws 352. In FIGURE 11 only the upper of two similar overload devices is shown. It is to be understood that one of such devices may be incorporated or two opposite ones for balanced safety, as desired.

The drive from flywheel 250 is transmitted to plates 351 of the overload mechanism 315, through the lugs 355, 355 extending from the hub face 312 of flywheel 250, through springs 356. Spring 356 extends between lug 355 and plate 351, about positioning screw 353. Positioning screw 353 operates into threaded member 354. Spring 356 is designed and pre-set to transmit a given amount of torque between lug 355 and plate 351 without deflecting. When an excess amount of torque is reached, spring 356 will deflect in a manner to be moved into dotted position 356′. Such deflection of spring 356 causes a change in the angular relation between hub 326 (and its attached parts) with respect to flywheel 250 (and its lugs 355).

A bracket 357 is secured to plate 350 on hub 326 by screws 358. In this manner, an angular displacement of hub 326 with respect to flywheel 250 likewise displaces bracket 357. The purpose of bracket 357 is to actuate a suitable electrical switch 360 to immediately disconnect clutch-brake 316, 317 as soon as such angular displacement occurs. An angular displacement occurs when the driving torque between lug 355 and plate 351 exceeds a reasonable amount of overload in a normal drive cycle under all conditions of operation, as well as exceeds the usual overload due to shock in the operation of the knife assembly. Beyond such point, spring 356 compresses, and the relative motion between the input and output ends of the overload mechanism 315 operates such switch 360, herein termed an overload switch.

Reference is made to FIGURE 12 for a schematic overload switch 360, connected to leads 359. The relation of overload switch 360 and the associated linkages in overload mechanism 315 operable by an angular displacement due to overload is shown in FIGURE 12. Bracket 327 secured to plate 350 and hub 326 is seen in elevation at the line 12—12 of FIGURE 11, in the direction of the arrows. A triangular lever 361 is pivoted at 326 in the end of a pivot stud 363 set into flywheel 250. Lever 361 is also guided in a slot in stud 364 in flywheel 250. The tip of lever 361 normally rests against the head of screw 365 set in bracket 357 by lock nut 366.

An actuating rod 367 is slideably mounted within a bore 368 of flywheel 250. A counter-balancing spring 369 maintains rod 367 into a biased position (to the left in FIGURE 12) against a collar 370 pinned to rod 367. The head of rod 367 coacts with the abutting top of lever 361. It will now be seen that upon a relative angular displacement of flywheel 250 and hub 326 of overload mechanism 315 (through the deflection of spring 356 to position 356′—FIGURE 11), bracket 357 secured to hub 326 moves in the counterclockwise direction (in FIGURE 11) and upwards in FIGURE 12. Such upward movement of bracket 357 carries screw 365 upwards, to tilt triangular lever 361 on its pivot 362. The head of rod 367 is thereupon moved inwards of flywheel 250 (to the right in FIGURE 12). The rod 367 accordingly is projected so that its tip 367′ (shown in dotted lines) is moved outside of the rotating flywheel 250. Suitable means are provided whereby the rod tip 367′ abuts a member 371 of overload switch 360 to actuate the switch 360. Member 371 may be one that pivots to operate switch 360 when abutted by rod tip 367′. Other equivalent means for actuating switch 360 by rod 367 may be used.

Overload switch 360 is, of course, mounted on a stationary portion of the machine and when abutted by projecting rod 367 of overload mechanism 315 serves to actuate a remote electrical circuit as required for the hereinstated purpose. Overload switch 360 may operate such circuit directly, through electron tubes, or through a relay. Its function is, when actuated by rod tip 367', to immediately cut off any current flowing to clutch coil 320 and brake coil 335. In other words, upon a mechanical overload displacement at mechanism 315, overload relay 360 is actuated to immediately de-energize clutch-brake 316, 317 whereupon the drive shaft 245 to knife assembly 105 is promptly stopped. The lockout relay (not shown) actuated by overload switch 360 remains in circuit, maintaining clutch-brake 316, 317 de-energized until the cause of the overload is removed, whereupon such relay is reset manually.

FRONT (KNIFE) CLAMP SYSTEM

As previously described in connection with FIGURES 1, 3 and 4, the front clamp 117 is situated behind knife assembly 105 and is operated by hydraulic cylinder 119 to press it down upon the front portion of the stack of sheets to be cut by blade 116. FIGURES 14 to 17 are enlarged detailed illustrations of front clamp assembly 117. It is important to operate the base section 380 of the bottom of clamp 117 in a level relation with respect to the stack. The clamp 117 is mounted transversely across the bed 150 of the cutting machine in a position to firmly clamp the stack of sheets to be cut by knife blade 116.

A torque bar 118 is provided with arms 381 to maintain the clamp 117 level to a predetermined degree. With full pressure on hydraulic cylinder 119 to actuate clamp 117, and a narrow stack on only one side under clamp base 380, the free side of clamp 117 can deflect only a small amount, say 1/16 of an inch with the invention system. In other words, the torque device of the present invention limits the amount of unlevelling of the clamp base 380 on the stack or at the free side to only a small amount, as 1/16. Thus, only a small amount of misalignment is permitted, not sufficient to prevent even a narrow pile of papers to be pressed down evenly for cutting.

The torque bar 118 extends across the bed of the machine, parallel to the base 380 of clamp 117. Bar 118 is suitably trunnioned to the frame of the cutting machine. A pair of arms 381, 381 extends from torque bar 118. A clevis 382 extends from each arm 381 to support a roller 383 at pin 384. A frame that coacts with vertical roller 383, 383 on each side of clamp 117 is provided through plates 385, 386 secured together by bolts 387 and vertical plates 388. The arms 381, 381 serve as levers to connect the torque shaft or bar 118 to the clamp 117 through the rollers 383, 383.

When the clamp 117 is actuated by the hydraulic cylinder 119 in the downward direction against a stack of shets on the work bed 150 of the machine, the clamp 117 is maintained in a vertical plane through the guide bars 395, 395 in guides heretofore described. Base 380 of clamp 117 is maintained in a predetermined relationship parallel to the bed 150 and stack through the torque rollers described herein. Cross-sectional FIGURE 16 is taken along the line 16—16 through FIGURE 14. Shown in dotted line is the lower position of the clamp 117 with its arm at 381' and roller 383' coacting with the downwardly moved clamp 117. The torque bar 118 remains in its fixed position, and it will now be understood that clamp 117 maintains its predetermined degree of alignment through this means.

A narrow stack is thereupon pressed down evenly, in any location across the work bed 150 of the machine, despite the fact that a single hydraulic cylinder 119 located in the central portion of the clamp 117 is used. A feature for guiding oil that normally leaks from cylinder 119 across the piston 119a is provided in the clamp 117. The oil is troughed in a frame 390, and a drainage opening 391 is at frame 390. Thus, any oil leaking around cylinder 119 or piston 119a is guided into drain 391 and on through a tube 392 to the end 393 opening at clamp guide bar 395 (on the left side in FIGURE 14). The opening end 393 of tube 392 is adjacent a wider opening 396 in the guide bar 395. Thus, oil leaking through tube 392 from cylinder 119 is guided to a guide bar 395 where it runs down into the oil sump in the main casting. This feature prevents oil leakage on the stack of sheets operated upon.

The "level" alignment stated for the front clamp 117 and the illustration of clamp 117 in FIGURE 14 as horizontal is for illustration clarity. As shown in FIGURES 1 to 4, the clamp 117 and its associated members are parallel to the cutting table 150, which is at the predetermined inclination to horizontal. Since the stack of sheets on the inclined table 150 is also at the same angle, the clamping bar 117 is parallel to the stack, and the alignment therefor is to maintain such parllelism within the limits described, as will be understood by those skilled in the art.

BACK GAUGE AND BACK GAUGE CLAMP

FIGURES 18, 19 and 20 are enlarged detailed representations of the exemplary back gauge 120 and back gauge clamping mechanism 122, 123 previously described and illustrated in perspective in FIGURE 3. It will be recalled that the purpose of the back gauge clamp 122, 123 is to exert a clamping force across the rear portion of the stack of sheets, at the position contiguous with the abutting vertical section 121 of the back gauge clamp 120. The clamping action of clamp 122, 123 on the stack of sheets is made sufficiently powerful so that the stack travels with the back gauge 120 serving as a virtual travelling table. The stack remains clamped regardless of the pressure exerted on the stack by the front clamp 117 at knife assembly 105.

Thus, after a transverse cut on the stack, the sheets in the stack remain in the same place as before the cutting, avoiding the need to realign the stack before the next cut. Furthermore, accelerations of movement of the stack with the back clamp of the present invention can be greater than heretofore possible, as can decelerations thereon due to stopping of the stack, under the control of the program device. FIGURES 18 and 19 are respective side and front views of the back gauge assembly and its associated back gauge clamping mechanism.

The work table 150 is shown as dashed lines and is comprised of spaced longitudinal bars 155. The back gauge 120 comprises a frame 400 with parallel spaced ribs 401 extending through the work bed 150 between the spacings of bars 155. This permits longitudinal movement of the back gauge 120 along the table 150. Back gauge 120 is mounted on top of work table 150, its front face 121 being perpendicular to the table. The back end of the stack of sheets to be cut is placed against the front face 121 of back gauge 120. The lower clamping jaws 123 are arranged in the spacings between table bars 155.

The clamping surfaces 123a of the clamping jaws 123 extend very slightly above the upper surface of the longitudinal bars 155, namely, above the upper surface of the work table 150. Thus, movement of the stack of sheets by the back gauge 120 will not be impeded by clamping pressure at the back gauge upon the stack. Vertical ribs 401 of back gauge face member 400 extend to and are integral with the lower clamping jaws 123. The ribs 401 and the associated jaws 123 constitute the framework 400 which, in turn, is suitably secured to vertical front guide section 405 that extends from back gauge base 406.

Back gauge base 406 is slideable along the surface of work table 150 and carries downwardly extending brackets or arms 407, 408. Arms 407, 408 extend through the slots between the table bars 155 to support the sub-structure of the back gauge to be described. A rear angle member 410 is accurately spaced behind the front support 405 by bushings 412. Extending integrally from vertical rear member 410 is its base section 411 bolted to the horizontal frame 406 by suitable bolts 414. The rear angle 410, 411 extends into an angular flange 415 supported on the back gauge structure and movable therewith.

The vertical portion 410 of the angle member contains a vertical slot 416 for guiding the movable clamp member 420, as shown in FIGURE 18. Clamp member 420 accordingly rides vertically in the guide slot 416 formed between the front guide 405 and the rear guide 410. Clamp member 420 is operated downwards to the clamping position by hydraulic cylinder 425 below the work bed 150 and associated with the back gauge mechanism, as will now be described.

The movable clamping jaws 122 extend from the clamp member 420 and are integrally movable therewith. The connecting rod 424 from the piston within cylinder 425 is coupled to the clevis 422 at the center of clamp 420 by pin 423. FIGURE 20 is a sectional view of such coupling of connecting rod 424 to clevis 422 of movable back gauge clamp member 420. When clamp member 420 is lowered, by the action of hydraulic cylinder 425 on the connecting rod 424, the back clamp member 420 is forced downwards and brings all the extending fingers or movable jaws 122 downward against the top of the paper stack, the end of which abuts the vertical surface 121 of the back gauge. The stack of sheets is thereupon clamped between the jaws 122a of movable fingers 122 and the lower jaws 123a, and against the vertical surface 121 of the back gauge 120.

The intensity of force exerted on the paper stack through the linkage on the movable jaws 122, by hydraulic cylinder 425, is such as to be equal to or preferably greater than the corresponding intensity of force exerted by the front clamp 117 on the front portion of the same paper stack, for the purposes already set forth. It is to be understood that in the exemplary embodiment the back gauge 120 and its associated back gauge clamp 122, 123 are parallel to the tilted work table 150, namely at $\theta°$ to the horizontal. In this manner, the paper stack, clamped between the coacting jaws 122a, 123a and vertical surface 121, in conjunction with the angular tilt of the stack, holds the stack powerfully and prevents its displacement under all operating conditions of the cutting machine.

The downwardly extending arms 407, 408 from the back gauge structure support under-structural frame members 430, 430. Members 430, 430 are connected together by a transverse structural member 431 to which is secured the mounting frame 432 of the hydraulic cylinder 425. It is to be understood that structural members 407, 408 and 430, 431 are all beneath the work table 150 and are, in turn, longitudinally movable with the back gauge 120 back and forth across the cutting machine. The hydraulic cylinder 425 is carried with the sub-structure herein set forth and is continuously operable upon the back gauge clamp 122, 123 in the manner set forth. A flexible hose (not shown) connects to the hydraulic input 433 of the cylinder 425.

The rear end 433 of each member 430, 430 contains a bearing 434 supporting the end of a torsion bar 435. Torsion bar 435 is linked to the clamp member 420 in the manner to now be described for the purpose of equalizing the motion of the clamp 122 in its clamping action. Thus, when a narrow stack of paper is clamped between the jaws 122a, 123a so that only one side of the transverse back gauge clamp is engaged, the force on the opposite or free side of the clamp, where no stack exists, tends to go down too low. However, with the torsion system herein, this force is retransmitted back to the clamping side and tends to stabilize and level the clamp member 420 and its corresponding projecting clamp fingers 122.

The torsion levelling arrangement for the clamp member 420 is provided as follows: Each end of the torsion bar 435 is connected to a crank arm 436 carrying at its forward end a connector 437. A connecting bar 438 extends from each connector 437 upwardly to the clamping member 420. The top end of each connecting rod 438, 438 is connected to the clamp member 420 at a clevis 440 through a pin 439.

BACK GAUGE DRIVE APPARATUS

The perspective FIGURE 3 shows the relationship of the longitudinally mounted hydraulic cylinder 157 and the drive for the back gauge 120. The pantograph drive coupling 160 is shown connecting the piston rod 158 to the depending lug 156 of the back gauge 120 for longitudinal actuation of the back gauge. Reference is now made to FIGURES 21 and 22. The pantograph 160 comprises links 450, 451 that are parallel and links 452, 453 also parallel. The links 450 to 453 form a parallelogram due to the pivotal points thereof at pins 454 through 457. The extension of pantograph arm 450 is directly coupled to the depending lug 156 of the back gauge 120, through pin 458. The lower pivot of the pantograph joining links 451 and 453 is secured to the fixed frame section 459, constituting an immovable base for the pantograph 160. An intermediate portion of link 452 is connected to the piston rod 158 through pin 460 and connector 461. Pins 456, 458 and 460 always remain in line.

The function of the pantograph 160 is to transmit the motion from horizontally actuated piston rod 158 to the horizontally or longitudinally movable back gauge 120 without distorting the alignment of either. Towards this end, the movement of extending pin 458 of pantograph 160 is always in a horizontal plane as is the corresponding movement of pin 460 in the pantograph. By proportioning the distance $a$ (between pins 456 and 460) to the distance $b$ (between pin 460 and pin 458), a resired leverage is afforded in the respective movements of piston rod 158 and back gauge 120.

In an exemplary embodiment, the distance between fixed point 456 and movable pin 458 (namely the distance $a$ plus $b$) was 2½ times the distance $a$. Thus, for a given movement of pin 460, namely for a given swing of hydraulic piston rod 158, the movement of back gauge 120 is correspondingly moved 2½ times as far and as fast. The force driving the back gauge at pin 458 is also in the inverse ratio of 2½ to 1, reduced in this instance. However, this is readily overcome by increasing the force of the drive by the hydraulic cylinder 157 until ample drive force on back gauge 120 is provided.

The resultant force by cylinder 157 to drive the back gauge 120 in its full sweep across the work table 150, which in the exemplary case was 60", is readily accomplished with the maintenance of the cylinder 157 and the piston rod 158 in perfect horizontal alignment throughout such swing. No pivoting of cylinder 157 is required. The back gauge 120 also is moved in a perfectly longitudinal manner, under the actuation of horizontal cylinder 157. Thus, it becomes unnecessary to support the hydraulic cylinder 157 in any movable manner. The bearings in the pantograph pivots 454 through 457 are preferable of the pre-loaded type, to eliminate play or backlash in the mechanism, thus giving very accurate responses between the movement of the piston rod 158 and the back gauge 120.

In operation of the back gauge 120, it is very important that when a stop position is reached, it be an exact stop position. Even an error of .001", would make a cut on a paper stack rejectable. Accordingly, utilization of pantograph 160 herein, with pre-loaded bearings, as set forth, avoids any play whatsoever, and insures stoppage at the exact predetermined position of the back gauge, and accordingly the stack, at the cutting positions.

The hydraulic cylinder 157 is shown supported horizontally between a portion of the main frame 100' and an intermediate frame 465. The frame 465 is further supported by the three-pipe structure 221, 222, 223 connecting it and a portion of the rear frame 224'. The enlarged FIGURE 22 is an end view of FIGURE 21 taken in the direction of the arrows 22, 22. In FIGURE 22 may be seen tubes 470, 470 which supply hydraulic power for the cylinder 425 of the back gauge clamp (FIGURES 18 and 19).

Other back gauge drive arrangements may be used in place of the hydraulic system of FIGURES 21 and 22 comprising hydraulic drive means 157, 158 and pantograph 160. The drive system of the above referred to patent appliaction Serial No. 571,518 may advantageously be utilized for the longitudinal operation of back gauge 120 along work table 150. The back gauge drive system of this application employs a drive screw parallel to the work table, driven by two motors and clutches, and controlled by a precise, adjustable, start-stop programming device and circuitry. Other programming controls may be employed as well.

After the back gauge 120 has moved forward to its last cutting position (to the left in FIGURE 3), it moves further forward to within ½" of the front knife clamp 117. Clamp 117 comes down and the back gauge clamp 122, 123 releases. The back gauge 120 thereupon is moved back, and then the main clamp 117 is released. At this point, an ejector shown in FIGURES 23 and 24 comes into operation, as will next be described.

EJECTOR MECHANISM

Reference is made to FIGURE 3 wherein an ejector mechanism, having fingers 220, is shown at the front or feed-out portion of the cutting machine. The purpose of the ejector mechanism is to mechanically remove the end portion of the stack or stacks of materials after the last cutting operation thereon and to move such end portion forward into conveyor 103 (FIGURES 1 and 2). FIGURES 23 and 24 are enlarged detail views of an exemplary embodiment of the ejector mechanism.

When the back gauge 120 has moved back, by a predetermined distance, after the last cut, a solenoid 475 is energized. Energization of solenoid 475 attracts into it armature member 476 secured to ejector lever 218 by pin 477. The ejector lever 218 is pivoted to a stationary bracket 478 by pin 479. The opposite end 480 of lever 218 secures the end of cable 217. The downward attraction of armature 476 (FIG. 24) causes cable 217 to be drawn downwardly to rotate ejector shaft 215 at pulley 216. The spring fingers 220, 220 are secured to the rod 215 and, are rotated clockwise from their normal out-of-the-way position. It will now be apparent that the clockwise rotation of fingers 224 (FIG. 24) move them between the spaces of table bars 155.

The fingers 220 thereupon abut the portion of the stack remaining adjacent the feed-out position, where the ejector is situated. The fingers 220, 220 get behind the stack portion that was left under the main clamp, and push it forward into the conveyor 103 (FIGS. 1, 2). It is to be understood that the main clamp 117 had already been retracted upwardly and out-of-the-way, prior to such ejection action. Furthermore, the back clamp 120 had already been returned, on its way toward its start (to right, FIG. 3), to permit the spring fingers 220 to move under the table through bars 155 for the ejection action. The timing thereof is controlled by the energization of the solenoid 475.

After sufficient interval to permit the full ejection by the clockwise rotation of the ejection fingers 220, and as the back gauge has moved further towards its rear (start) position, solenoid 475 is de-energized. The spring fingers 220 thereupon are returned to their lower position, shown in solid lines in FIG. 24, by the biasing action of the springs 485, 485 secured beneath the table 150. Cable 217 is moved to its normal unactivated downward position, and lever 218 is returned to its unactuated position for the next ejection cycle.

It is to be understood that in place of the solenoid 475 of FIGURES 23 and 24 other actuation means are equally feasible. One such form is a mechanical linkage arrangement from a movable machine member (such as the back gauge) to the cable 217 or directly to the ejector shaft 215, all in proper cycling and timing with the other aspects of the cutting operation. The reverse or resetting of such displaced cable may thereupon be effected by a solenoid.

It is to be understood that the exemplary cutting machine herein described and illustrated and its associated features and component sections may take various other forms and arrangements within the broader spirit and scope of the invention as defined in the following claims.

I claim:
1. A machine of the character described for successively cutting a stack of sheets transversely comprising a work table for supporting the stack; a back gauge mounted transverse of and movable along said table having a face cooperable with the rear end of the stack of sheets; a reciprocable knife assembly with a blade arranged transverse of said table for successively cutting forward portions of the stack when projected into the knife assembly; a clamp mounted with said back gauge for firmly gripping the rear portion of said stack of sheets; and means for motivating said back gauge together with said clamp in controllable stages towards said knife assembly with the stack of sheets held firmly by said clamp and back gauge, whereby the sheets of the stack maintain registry despite accelerations and decelerations in their travel cycle; said work table being composed of a plurality of spaced longitudinal bars, and said clamp comprising a plurality of spaced fingers interposed between said bars, said clamp fingers extending from said clamp and having stack gripping edges substantially at the working plane of said table, a plurality of displaceable arms associated with said fingers mounted on said back guage for engagement with the stack, a plurality of rods extending through bar spaces from beneath the work table to operate said arms in unison against the stack, and means for actuating said rods, said means including actuating mechanism connected to said rods and arranged solely beneath said work table.

2. A machine of the character described for cutting a stack of sheets comprising a work table for supporting the stack; a back gauge movable along said table with a face cooperable with the stack of sheets; and a clamp mounted with said back gauge for gripping the stack of sheets, said clamp being composed of a plurality of spaced fingers extending from said clamp and having stack gripping edges substantially at the working plane of said table, a plurality of displaceable arms associated with said fingers and mounted on said back gauge for engagement with the stack, and means for actuating said arms in unison into stack engagement during forward motivation of said back gauge, said means including a linkage coupled to said arms and actuating mechanism connected to said linkage and arranged solely beneath said work table.

3. A machine as claimed in claim 2, further including apparatus positioned beneath the work table for controllably motivating said back gauge along said work table including hydraulic means having a piston and a rod, and a pantograph linkage mechanically coupling said back gauge with said piston rod to effect substantially precise positioning of the back gauge by said rod.

4. A machine as claimed in claim 3, with said hydraulic means including pre-loaded bearings, said rod being arranged horizontally and said pantograph being proportioned to maintain said piston rod substantially horizontal throughout its back gauge drive cycle.

References Cited in the file of this patent

UNITED STATES PATENTS

| | | |
|---|---|---|
| 240,376 | Brown | Apr. 19, 1881 |
| 272,202 | Bradley | Feb. 13, 1883 |
| 326,916 | Morse | Sept. 22, 1885 |
| 647,189 | Leeds | Apr. 10, 1900 |
| 840,553 | Bradt | Jan. 8, 1907 |
| 1,000,855 | Totten | Aug. 15, 1911 |

(Other references on following page)

UNITED STATES PATENTS

| | | |
|---|---|---|
| 1,148,162 | Gordon | July 27, 1915 |
| 1,247,603 | Ward | Nov. 20, 1917 |
| 1,261,305 | Seybold | Apr. 2, 1918 |
| 1,347,536 | Downie | July 26, 1920 |
| 1,429,310 | Winkley | Sept. 19, 1922 |
| 1,547,828 | Schroeter | July 28, 1925 |
| 1,907,903 | Valiquette | May 9, 1933 |
| 1,957,711 | Heyman | May 8, 1934 |
| 2,095,711 | Brackett et al. | Oct. 12, 1937 |
| 2,127,563 | Johnston | Oct. 12, 1938 |
| 2,181,639 | Curtis | Nov. 28, 1939 |
| 2,242,932 | Turner | May 20, 1941 |
| 2,244,215 | Pescara | June 3, 1941 |
| 2,353,405 | King | July 11, 1944 |
| 2,379,171 | McLaughlin | June 26, 1945 |
| 2,487,031 | Seybold | Nov. 1, 1949 |
| 2,549,560 | Archer | Apr. 17, 1951 |
| 2,570,873 | Seybold | Oct. 9, 1951 |
| 2,709,509 | Haywood | May 31, 1955 |
| 2,760,571 | Dayton | Aug. 28, 1956 |

FOREIGN PATENTS

| | | |
|---|---|---|
| 89,247 | Switzerland | May 2, 1921 |

OTHER REFERENCES

Flynn and Emrich Co. Bulletin No. 2004, "Automatic Ice Cubers."

Practical Physics (Carhart and Chute), published by Allyn and Bacon, 1920.